United States Patent
Medard et al.

(10) Patent No.: US 11,126,595 B2
(45) Date of Patent: Sep. 21, 2021

(54) NETWORK CODED STORAGE WITH MULTI-RESOLUTION CODES

(71) Applicant: Massachusetts Institute of Technology, Cambridge, MA (US)

(72) Inventors: Muriel Medard, Belmont, MA (US); Ulric J. Ferner, Cambridge, MA (US); Tong Wang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 65 days.

(21) Appl. No.: 16/565,724

(22) Filed: Sep. 10, 2019

(65) Prior Publication Data

US 2020/0089662 A1    Mar. 19, 2020

Related U.S. Application Data

(63) Continuation of application No. 15/427,536, filed on Feb. 8, 2017, now Pat. No. 10,452,621, which is a continuation of application No. 13/965,721, filed on Aug. 13, 2013, now Pat. No. 9,607,003.

(60) Provisional application No. 61/783,522, filed on Mar. 14, 2013.

(51) Int. Cl.
*G06F 16/182* (2019.01)
*H04N 21/2343* (2011.01)
*H04N 21/2312* (2011.01)

(52) U.S. Cl.
CPC ..... *G06F 16/1827* (2019.01); *H04N 21/2312* (2013.01); *H04N 21/23439* (2013.01); *H04N 21/234327* (2013.01); *H04N 21/234363* (2013.01)

(58) Field of Classification Search
CPC .................. G06F 16/71; H04N 21/234327
See application file for complete search history.

(56) References Cited

U.S. PATENT DOCUMENTS

| | | | |
|---|---|---|---|
| 5,577,056 A | 11/1996 | Malik et al. | |
| 6,128,773 A | 10/2000 | Snider | |
| 6,266,817 B1 | 7/2001 | Chaddha | |
| 6,621,851 B1 | 9/2003 | Agee et al. | |
| 6,633,725 B2 | 10/2003 | Hughes, Jr. et al. | |
| 6,885,653 B2 | 4/2005 | Choi et al. | |
| 7,020,195 B1* | 3/2006 | McMahon | H04N 21/234372 375/240.11 |

(Continued)

FOREIGN PATENT DOCUMENTS

| | | |
|---|---|---|
| EP | 1 638 239 A1 | 3/2006 |
| KR | 10-2014-0017433 | 2/2014 |

(Continued)

OTHER PUBLICATIONS

Ferner, Ulric J., Muriel Médard, and Emina Soljanin. "Toward sustainable networking: Storage area networks with network coding." 2012 50th Annual Allerton Conference on Communication, Control, and Computing (Allerton). IEEE, 2012. (Year: 2012).*

(Continued)

*Primary Examiner* — William Spieler
(74) *Attorney, Agent, or Firm* — Daly, Crowley, Mofford & Durkee, LLP

(57) ABSTRACT

Multi-resolution encoded files are stored on a plurality of disk drives using systematic network coded storage. In some embodiments, the stored files are used to provide video streaming services for users.

17 Claims, 4 Drawing Sheets

(56) References Cited

U.S. PATENT DOCUMENTS

| | | |
|---|---|---|
| 7,028,096 B1 | 4/2006 | Lee |
| 7,064,489 B2 | 6/2006 | Price |
| 7,071,853 B2 | 7/2006 | Price |
| 7,095,343 B2 | 8/2006 | Xie et al. |
| 7,164,691 B2 | 1/2007 | Knapp et al. |
| 7,283,564 B2 | 10/2007 | Knapp et al. |
| 7,349,440 B1 | 3/2008 | Chou et al. |
| 7,408,938 B1 | 8/2008 | Chou et al. |
| 7,414,978 B2 | 8/2008 | Lun et al. |
| 7,529,198 B2 | 5/2009 | Jain et al. |
| 7,706,365 B2 | 4/2010 | Effros et al. |
| 7,760,728 B2 | 7/2010 | Chou et al. |
| 7,821,980 B2 | 10/2010 | Chakrabarti et al. |
| 7,876,677 B2 | 1/2011 | Cheshire |
| 7,912,003 B2 | 3/2011 | Radunovic et al. |
| 7,945,842 B2 | 5/2011 | He |
| 7,953,882 B2 | 5/2011 | Shukla et al. |
| 8,040,836 B2 | 10/2011 | Wu et al. |
| 8,068,426 B2 | 11/2011 | Sundararajan et al. |
| 8,130,776 B1 | 3/2012 | Sundararajan et al. |
| 8,279,781 B2 | 10/2012 | Lucani et al. |
| 8,451,756 B2 | 5/2013 | Lucani et al. |
| 8,482,441 B2 | 7/2013 | Medard et al. |
| 8,504,504 B2 | 8/2013 | Liu |
| 8,571,214 B2 | 10/2013 | Lima et al. |
| 8,645,561 B2 | 2/2014 | Luzzatti et al. |
| 9,607,003 B2 | 3/2017 | Medard et al. |
| 2003/0055614 A1 | 3/2003 | Pelikan |
| 2003/0214951 A1 | 11/2003 | Joshi et al. |
| 2004/0203752 A1 | 10/2004 | Wojaczynski et al. |
| 2005/0010675 A1 | 1/2005 | Jaggi et al. |
| 2005/0078653 A1 | 4/2005 | Agashe et al. |
| 2005/0152391 A1 | 7/2005 | Effros et al. |
| 2005/0251721 A1 | 11/2005 | Ramesh et al. |
| 2006/0020560 A1 | 1/2006 | Rodriguez et al. |
| 2006/0146791 A1 | 7/2006 | Deb et al. |
| 2006/0149753 A1 | 7/2006 | Medard et al. |
| 2006/0224760 A1 | 10/2006 | Yu et al. |
| 2007/0046686 A1 | 3/2007 | Keller |
| 2007/0081588 A1 | 4/2007 | Raveendran et al. |
| 2007/0116027 A1 | 5/2007 | Ciavaglia et al. |
| 2007/0274324 A1 | 11/2007 | Wu et al. |
| 2008/0043676 A1 | 2/2008 | Mousseau et al. |
| 2008/0049746 A1 | 2/2008 | Morrill et al. |
| 2008/0123579 A1 | 5/2008 | Kozat et al. |
| 2008/0259796 A1 | 10/2008 | Abousleman et al. |
| 2008/0291834 A1 | 11/2008 | Chou et al. |
| 2008/0320363 A1 | 12/2008 | He |
| 2009/0003216 A1 | 1/2009 | Radunovic et al. |
| 2009/0031038 A1 | 1/2009 | Shukla et al. |
| 2009/0135717 A1 | 5/2009 | Kamal et al. |
| 2009/0153576 A1 | 6/2009 | Keller |
| 2009/0175320 A1 | 7/2009 | Haustein et al. |
| 2009/0198829 A1 | 8/2009 | Sengupta et al. |
| 2009/0207930 A1 | 8/2009 | Sirkeci et al. |
| 2009/0238097 A1 | 9/2009 | Le Bars et al. |
| 2009/0248898 A1 | 10/2009 | Gkantsidis et al. |
| 2009/0285148 A1 | 11/2009 | Luo et al. |
| 2009/0310582 A1 | 12/2009 | Beser |
| 2009/0313459 A1 | 12/2009 | Horvath |
| 2009/0316763 A1 | 12/2009 | Erkip et al. |
| 2010/0002069 A1 | 1/2010 | Eleftheriadis et al. |
| 2010/0014669 A1 | 1/2010 | Jiang |
| 2010/0046371 A1 | 2/2010 | Sundararajan et al. |
| 2010/0057636 A1 | 3/2010 | Brennan |
| 2010/0111165 A1 | 5/2010 | Kim et al. |
| 2010/0146357 A1 | 6/2010 | Larsson |
| 2010/0333143 A1 | 12/2010 | Civanlar et al. |
| 2011/0238855 A1 | 9/2011 | Korsunsky et al. |
| 2011/0243324 A1 | 10/2011 | Lima et al. |
| 2012/0057636 A1 | 3/2012 | Tian et al. |
| 2012/0218891 A1 | 8/2012 | Sundararajan et al. |
| 2012/0300692 A1 | 11/2012 | Sfar et al. |
| 2013/0107764 A1 | 5/2013 | Zeger et al. |
| 2013/0114481 A1 | 5/2013 | Kim et al. |
| 2013/0114611 A1 | 5/2013 | Zeger et al. |
| 2013/0195106 A1 | 8/2013 | Calmon et al. |
| 2014/0064296 A1 | 3/2014 | Haeupler et al. |
| 2014/0185803 A1 | 7/2014 | Lima et al. |
| 2014/0268398 A1 | 9/2014 | Medard et al. |
| 2014/0269485 A1 | 9/2014 | Medard et al. |
| 2014/0269503 A1 | 9/2014 | Medard et al. |
| 2014/0269505 A1 | 9/2014 | Medard et al. |
| 2014/0280395 A1 | 9/2014 | Medard et al. |
| 2014/0280454 A1 | 9/2014 | Medard et al. |

FOREIGN PATENT DOCUMENTS

| | | | |
|---|---|---|---|
| WO | WO 2007/109216 A1 | 9/2007 | |
| WO | WO 2010/005181 A2 | 1/2010 | |
| WO | WO 2010/005181 A3 | 1/2010 | |
| WO | WO 2010/025362 A2 | 3/2010 | |
| WO | WO 2010/025362 A3 | 3/2010 | |
| WO | WO 2011/043754 A1 | 4/2011 | |
| WO | WO 2011/119909 A1 | 9/2011 | |
| WO | WO 2012/167034 A2 | 12/2012 | |
| WO | WO 2013/006697 A2 | 1/2013 | |
| WO | WO 2013/067488 A1 | 5/2013 | |
| WO | WO 2013/116456 A1 | 8/2013 | |
| WO | WO 2014/159570 A1 | 10/2014 | |
| WO | WO 2014/160194 A3 | 10/2014 | |

OTHER PUBLICATIONS

U.S. Appl. No. 13/654,953, filed Oct. 18, 2012, Zeger, et al.
U.S. Appl. No. 13/655,034, filed Oct. 18, 2012, Medard, et al.
U.S. Appl. No. 13/890,604, filed May 9, 2013, Zeger, et al.
U.S. Appl. No. 14/208,683, filed Mar. 13, 2014, Calmon, et al.
U.S. Appl. No. 14/297,090, filed Jun. 5, 2014, Kim, et al.
U.S. Appl. No. 14/668,185, filed Mar. 25, 2015, Medard, et al.
U.S. Appl. No. 14/678,359, filed Apr. 3, 2015, Zeger, et al.
U.S. Appl. No. 14/826,256, filed Aug. 14, 2015, Zeger, et al.
U.S. Appl. No. 14/843,358, filed Sep. 2, 2015, Haupler, et al.
U.S. Appl. No. 14/882,115, filed Aug. 10, 2015, Lima, et al.
U.S. Appl. No. 15/427,536, filed Feb. 8, 2017, Medard, et al.
"Data Service Options for Spread Spectrum Systems: Radio Link Protocol Type 3;" 3GPP2 C.S0017-010-A; Version 2.0; Sep. 2005.
"Guest Editorial Wireless Video Transmission;" IEEE Journal on Selected Areas in Communications; vol. 28; No. 3; Apr. 2010; pp. 297-298.
Abichar, et al.; "WiMax vs. LTE: Who Will Lead the Broadband Mobile Internet?;" Mobile Computing; IEEE Computer Society; IT Pro May/Jun. 2010; pp. 26-32.
AbuZeid, et al.; "IR-HARQ vs. Joint Channel-Network Coding for Cooperative Wireless Communication;" Cyber Journals: Multidisciplinary Journals in Science and Technology, Journal of Selected Areas in Telecommunications (JSAT); Aug. 2011; pp. 39-43.
Acedanski, et al.; "How Good is Random Linear Coding Based Distributed Network Storage?;" Proc. 1$^{st}$ Workshop on Network Coding, Theory, and Applications (Netcod'05); Apr. 2005; 6 pages.
Adamson, et al.; "Multicast Negative-Acknowledgment (NACK) Building Blocks;" Internet Engineering Task Force (IETF),RFC; vol. 5401; Nov. 2008; 42 pages.
Adamson, et al.; "NACK-Oriented Reliable (NORM) Transport Protocol;" Internet Engineering Task Force (IETF); RFC; vol. 5740; Nov. 2009; 94 pages.
Adamson, et al.; "Quantitative Prediction of NACK-Oriented Reliable Multicast (NORM) Feedback;" Proceedings, MILCOM 2000; vol. 2; Oct. 2002; 6 pages.
Ahlswede, et al.; "Network Information Flow;" IEEE Transactions on Information Theory; vol. 46; No. 4; Jul. 2000; pp. 1204-1216.
Ahmed, et al.; "On the Scaling Law of Network Coding Gains in Wireless Networks;" IEEE; MILCOM 2007; Oct. 2007; 7 pages.
Allman, et al.; "Fast Retransmit / Fast Recovery—TCP Congestion Control;" IETF; Section 3.2; RFC 2581; http://tools.ietf.org/html/rfc2581#section-3.2; Apr. 1999; downloaded on Nov. 2, 2011; 14 pages.

(56) References Cited

OTHER PUBLICATIONS

Armstrong, et al.; "Distributed Storage with Communcation Costs;" IEEE Forty-Ninth Annual Allerton Conference—Allerton House; Sep. 28-30, 2011; pp. 1358-1365.

Awerbuch, et al.; "On-Line Generalized Steiner Problem;" Proceedings of the $7^{th}$ Annual ACM-SIAM Symposium on Discrete Algorithms; pp. 1-12; 1996.

Baek, et al.; "The International Journal of Computer and Telecommunications Networking;" vol. 56; Issue 6; Apr. 2012; pp. 1745-1762.

Baron, et al.; "Coding Schemes for Multislot Messages in Multichannel ALOHA With Deadlines;" IEEE Transactions on Wireless Communications; vol. 1; No. 2; Apr. 2002; pp. 292-301.

Bellare, et al.; "A Concrete Security Treatment of Symmetric Encryption: Analysis of the DES Modes of Operation;" Proc. $38^{th}$ Annual Symposium on Foundations of Computer Science; Oct. 1997; pp. 1-32.

Berman, et al.; "Improved Approximations for the Steiner Tree Problem;" Journal of Algorithms; Chapter 39; pp. 325-334.

Bhadra, et al.; "Looking at Large Networks: Coding vs. Queuing;" Proc. of the $25^{th}$ IEEE International Conference on Computer Communications (INFOCOM); Apr. 2006; 12 pages.

Bharath-Kumar, et al.; "Routing to Multiple Destinations in Computer Networks;" IEEE Transactions on Communications; vol. Com-31; No. 3; Mar. 1983; pp. 343-351.

Bhargava, et al.; "Forward Error Correction Coding;" Mobile Communications Handbook; Part 1: Basic Principals; 1999; 18 pages.

Birk, et al.; "Judicious Use of Redundant Transmissions in Multichannel ALOHA Networks with Deadlines;" IEEE Journal on Selected Areas in Communications; vol. 17; No. 2; Feb. 1999; pp. 257-269.

Bisson, et al.; "Reducing Hybrid Disk Write Latency with Flash-Backed I/O Requests;" Proceedings of the Fifteenth IEEE International Symposium on Modeling, Analysis, and Simulation of Computer and Telecommunications Systems (MASCOTS'07); Oct. 2007; pp. 402-409.

Bonnin, et al.; "Automatic Multi-Interface Management Through Profile Handling;" Springer; Mobile Networks and Applications; Feb. 2009; pp. 4-17.

Borokhovich, et al.; "Tight bounds for Algebraic Gossip on Graphs;" Proc. of the IEEE International Symposium on Information Theory (ISIT); Jun. 13-18, 2010; 14 pages.

Borst, et al.; "Distributed Caching Algorithms for Content Distribution Networks"; IEEE INFOCOM; 2010 Proceedings IEEE; Mar. 14-19, 2010; 9 pages.

Borst, et al.; "Distributed Caching Algorithms for Content Distribution Networks;" Power Point Presentation; BCAM Seminar; Bilbao, Sep. 30, 2010; 36 pages.

Bui, et al.; "A Markovian Approach to Multipath Data Transfer in Overlay Networks;" IEEE Transactions on Parallel and Distributed Systems; vol. 21; No. 10; Oct. 2010; pp. 1398-1411.

Cai, et al.; "Secure Network Coding;" IEEE; ISIT; Jun. 30-Jul. 5, 202; p. 323.

Calmon, et al.; "Network Coding Over Multiple Network Interfaces Using TCP;" Presentation; Information Theory and Applications Workshop (ITA) 2012; San Diego, CA; Feb. 5, 2012; 55 pages.

Cardinal, et al; "Minimum Entropy Combinatorial Optimization Problems;" Data Structure and Algorithms, Discrete Mathematics; Aug. 17, 2010; pp. 1-16.

Castro, et al.; "Upper and Lower Error Bounds for Active Learning;" The 44'th Annual Allerton Conference on Communication, Control and Computing; vol. 2, No. 2.1; 2006, 10 pages.

Celik, et al.; "MAC for Networks with Multipacket Reception Capability and Spatially Distributed Nodes;" Proc. IEEE INFOCOM 2008; Apr. 2008; 9 pages.

Celik; "Distributed MAC Protocol for Networks with Multipacket Reception Capability and Spatially Distributed Nodes;" Master's Thesis; MIT Department of Electrical Engineering and Computer Science; May 2007; 127 pages.

Cha, et al.; "I Tube, You Tube, Everybody Tubes: Analyzing the World's Largest User Generated Content Video System;" $7^{th}$ ACM GIGCOMM Conference on Internet Measurement; IMC'07; Oct. 24-26, 2007; 13 pages.

Chakrabarti, et al.; "Approximation Algorithms for the Unsplittable Flow Problem;" Proceedings of the $5^{th}$ International Workshop on Approximation Algorithms for Combinatorial Optimization; Sep. 2005, pp. 1-27.

Chakrabarti, et al.; Approximation Algorithms for the Unsplittable Flow Problem; Algorithmica (2007); Springer Science—Business Media, Aug. 2006; 16 pages.

Charikar, et al.; "Approximation Algorithms for Directed Steiner Problems;" Proceedings of the $9^{th}$ ACM-SIAM Symposium on Discrete Algorithms, pp. 1-15; 1998.

Chen, et al.; "Pipeline Network Coding for Multicast Streams;" ICMU Org.; 2010; 7 pages.

Chou, et al.; "FEC and Pseudo-ARQ for Receiver-driven Layered Multicast of Audio and Video;" Data Compression Conference (DCC), 2000; Proceedings; Jan. 2000; 10 pages.

Chou, et al.; "Practical Network Coding;" Proceedings of the $41^{st}$ Annual Allerton Conference on Communication, Control, and Computing; Oct. 2003; 10 pages.

Cisco Visual Networking Index: Forecast and Methodology; 2009-2014; White Paper; Jun. 2, 2010; pp. 1-17.

Cloud, et al.; "Co-Designing Multi-Packet Reception, Network Coding, and MAC Using a Simple Predictive Model;" arXiv:1101.5779v1 [cs.NI]; Submitted to W.Opt 2011;Jan. 30, 2011; pp. 1-8.

Cloud, et al.; "Effects of MAC approaches on non-monotonic saturation with COPE—a simple case study;" Military Communication Conference, 2011—MILCOM; Aug. 11, 2011; 7 pages.

Cloud, et al.; "MAC Centered Cooperation—Synergistic Design of Network Coding, Multi-Packet Reception, and Improved Fairness to Increase Network Throughput;" IEEE Journal on Selected Areas in Communications; vol. 30; No. 2; Feb. 2012; pp. 1-8.

Cloud, et al.; "Multi-Path TCP with Network Coding;" Wireless@mit—MIT Center for Wireless Networks and Mobile Computing; 2012 Inaugural Retreat; Oct. 10-11, 2012.

Cloud, et al; U.S. Appl. No. 13/654,953, filed Oct. 18, 2012.

Costa, et al.; "Informed Network Coding for Minimum Decoding Delay;" Fifth IEEE International Conference on Mobile Ad-hoc and Sensor Systems; Sep. 2008; pp. 80-91.

Coughlin, et al.; Years of Destiny: HDD Capital Spending and Technology Developments from 2012-2016; IEEE Santa Clara Valley Magnetics Society; Jun. 19, 2012; pp. 1-28.

Dana, et al.; "Capacity of Wireless Erasure Networks;" IEEE Transactions on Information Theory; vol. 52; No. 3; Mar. 2006; pp. 789-804.

Dana, et al.; "Capacity of Wireless Erasure Networks;" Jan. 2006; 41 pages.

Deb, et al.; "Algebraic Gossip: A Network Coding Approach to Optimal Multiple Rumor Mongering;" Proc. of the $42^{nd}$ Allerton Conference on Communication, Control, and Computing; Jan. 2004; 10 pages.

Deb, et al.; "On Random Network Coding Based Information Dissemination;" Proc. of the IEEE International Symposium on Information Theory (ISIT); Sep. 4-9, 2005; 5 pages.

Demers, et al.; "Epidemic Algorithms for Replicated Database Maintenance;" PODC '87 Proceedings of the sixth annual ACM Symposium on Principles of distributed computing; Jan. 1987; pp. 1-12.

Dias, et al.; "Performance Analysis of HARQ in WiMax Networks Considering Imperfect Channel Estimation;" The $7^{th}$ International Telecommunications Symposium (ITS 2010); 2010; 5 pages.

Dimakis, et al.; "A Survey on Network Codes for Distributed Storage;" Proceedings of the IEEE; vol. 99; No. 3; Mar. 2011; pp. 476-489.

Dimakis, et al.; "Network Coding for Distributed Storage Systems;" IEEE/ACM Transactions on Information Theory; vol. 56; No. 9; pp. 1-13.

Donoho, et al.; "Estimating Covariances of Locally Stationary Processes: Rates of Convergence of Best Basis Methods;" Statistics, Stanford University, Stanford, California, USA, Tech. Rep; 1998; pp. 1-64.

(56) References Cited

OTHER PUBLICATIONS

Effros; Distortion-Rate Bounds for Fixed- and Variable-Rate Multiresolution Source Codes; IEEE Transactions on Information Theory; vol. 45, No. 6; Sep. 1999; pp. 1887-1910.
Effros; "Universal Multiresolution Source Codes;" IEEE Transactions on Information Theory; vol. 47; No. 6; Sep. 2001; pp. 2113-2129.
El Bahri, et al.; "Performance Comparison of Type I, II and III Hybrid ARQ Schemes over AWGN Channels;" 2004 IEEE International Conference on Industrial Technology (ICIT); vol. 3; Dec. 8-10, 2004; pp. 1417-1421.
Eryilmaz, et al.; On Delay Performance Gains From Network Coding; Information Sciences and Systems; 2006 40$^{th}$ Annual Conference on Mar. 22-24, 2006; 7 pages.
Extended European Search Report dated Aug. 25, 2016 corresponding to European Application No. 14776152.2; 11 Pages.
Fan, et al.; "Reliable Relay Assisted Wireless Multicast Using Network Coding;" IEEE Journal on Selected Areas in communications; vol. 27; No. 5; Jun. 2009; pp. 749-762.
Feizi, et al.; "Locally Adaptive Sampling;" Communication, Control, and Computing; 2010; 48$^{th}$ Annual Allerton Conference, IEEE; Sep. 29, 2010; pp. 152-159.
Feizi, et al.; "On Network Functional Compression;" arXiv online repository; URL: http://arxiv.org/pdf/1011.5496v2.pdf; Nov. 30, 2010p pp. 1-60.
Feizi, et al.; "When Do Only Sources Need to Compute? On Functional Compression in Tree Networks;" 47$^{th}$ Annual Allerton Conference, IEEE; Sep. 30, 2009; pp. 447-454.
Feizi, et al; "Cases Where Finding a Minimum Entrophy Coloring of a Characteristic Graph is a Polynomial Time Problem;" IEEE International Symposium on Information Theory; Jun. 13, 2010; pp. 116-120.
Ferner, et al.; "Toward Sustainable Networking: Storage Area Networks with Network Coding;" Fiftieth Annual Allerton Conference; IEEE; Oct. 1-5, 2012; pp. 517-524.
Ford; "Architectural Guidelines for Multipath TCP Development;" Internet Engineering Task Force; Internet-Draft; Dec. 8, 2010; 17 pages.
Ford; "TCP Extension for Multipath Operation with Multiple Addresses draft-ford-mptcp-multiaddressed-03;" Internet Engineering Task Force; Internet-Draft; Mar. 8, 2010; 35 pages.
Fragouli, et al.; "Wireless Network Coding: Opportunities & Challenges;" MILCOM; Oct. 2007; 8 pages.
Frossard, et al.; "Media Streaming With Network Diversity;" Invited Paper; Proceedings of the IEEE; vol. 96, No. 1; Jan. 2008; pp. 39-53.
Galbraith, et al.; (HGST); "Iterative Detection Read Channel Technology in Hard Disk Drives;" Whitepaper; Nov. 2008; 8 pages.
Garcia-Luna-Aceves; "Challenges: Towards Truly Scalable Ad Hoc Networks;" MobiCom 2007; Sep. 2007; pp. 207-214.
Garcia-Luna-Aceves; "Extending the Capacity of Ad Hoc Networks Beyond Network Coding;" IWCMC 07; Proceedings of the 2007 International Conference on Wireless Communications and Mobile Computing; ACM; 2007; pp. 91-96.
Ghaderi, et al.; Reliability Gain of Network Coding in Lossy Wireless Networks; Infocom 2008; The 27$^{th}$ Conference on Computer Communications IEEE; Apr. 13-18, 2008; 5 pages.
Gheorghiu, et al.; "Multipath TCP with Network Coding for Wireless Mesh Networks;" IEEE Communications (ICC) 2010 International Conference; May 23-27, 2010; 5 pages.
Gheorghiu, et al.; "On the Performance of Network Coding in Multi-Resolution Wireless Video Streaming;" IEEE International Symposium on Jun. 9-11, 2010; 6 pages.
Ghez, et al.; "Stability Properties of Slotted Aloha with Multipacket Reception Capability;" IEEE Transactions on Automatic Control; vol. 33; No. 7; Jul. 1988; pp. 640-649.
Gkantsidis, et al.; "Cooperative Security for Network Coding File Distribution;" Proc. IEEE Infocom; Apr. 2006; 13 pages.
Gollakota, et al.; "ZigZag Decoding: Combating Hidden Terminals in Wireless Networks;" SIGCOMM 08; Aug. 17-22; pp. 159-170.

Golrezaei, et al.; "FemtoCaching: Wireless Video Content Delivery Through Distributed Caching Helpers;" arXiv:1109.4179v2; Apr. 7, 2012; pp. 1-11.
Grant, et al.; "Graph Implementation for Nonsmooth Convex Programs;" LNCIS 371; Springer-Verlag Limited; Jan. 2008; pp. 95-110.
Gupta; "The Capacity of Wireless Networks;" IEEE Transactions on Information Theory; vol. 46; No. 2; Mar. 2000; pp. 388-404.
Hadzi-Velkov, et al.; "Capture Effect in IEEE 802.11 Basic Service Area Under Influence of Rayleigh Fading and Near/Far Effect;" IEEE; PIMRC 202; vol. 1; Sep. 2002; 5 pages.
Haeupler, et al.; "One Packet Suffices—Highly Efficient Packetized Network Coding With Finite Memory;" IEEE International Symposium on Information Theory (ISIT) Proceedings; Jul. 31, 2011-Aug. 5, 2011; 5 pages.
Haeupler, et al.; "Optimality of Network Coding in Packet Networks;" ArXiv, Feb. 17, 2011; 5 pages.
Haeupler; "Analyzing Network Coding Gossip Made Easy;" Proc. of the 43$^{rd}$ Symposium on Theory of Computing (STOC); Jan. 2011, 13 pages.
Haley, et. al.; "Reversible Low-Density Parity-Check Codes;" IEEE Transactions on Information Theory; vol. 55; No. 5; May 2009; pp. 2016-2036.
Halloush, et al.; "Network Coding with Multi-Generation Mixing: Analysis and Applications for Video communication;" IEEE International Conference on Communications; May 19, 2008; pp. 198-202.
Han, et al.; "Multi-Path TCP: A Joint Congestion Control and Routing Scheme to Exploit Path Diversity in the Internet;" IEEE/ACM Transactions on Networking (TON); vol. 14; No. 6, Dec. 2006; 26 pages.
Han, et al.; "On Nework Coding for Security;" IEEE Military Communications Conference; Oct. 2007; pp. 1-6.
Hassner, et al.; "4K Bye-Sector HDD-Data Format Standard;" Windows Hardware and Driver Central; San Jose, CA; Aug. 14, 2013; 5 pages.
Ho, et al.; "A Random Linear Network Coding Approach to Multicast;" IEEE Transactions on Information Theory; vol. 52; No. 10; Oct. 2006, pp. 4413-4430.
Ho, et al.; "Byzantine Modification Detection in Multicast Networks using Randomized Network Coding;" IEEE; ISIT; Jun. 27-Jul. 2, 2004; p. 144.
Ho, et al.; "Network Coding from a Network Flow Perspective;" ISIT; Jun.-Jul. 2003; 6 pages.
Ho, et al.; "On Randomized Network Coding;" Proceedings of 41$^{st}$ Annual Allerton Conference on Communications, Control and Computing; Oct. 2003; 10 pages.
Ho, et al.; "On the utility of network coding in dynamic environments;" International Workshop on Wireless AD-HOC Networks (IWWAN); 2004; pp. 1-5.
Ho, et al.; "The Benefits of Coding over Routing in a Randomized Setting;" Proceedings of 2003 IEEE International Symposium on Information Theory; Jun. 2003; pp. 1-6.
Ho, et al.; "The Benefits of Coding over Routing in a Randomized Setting;" IEEE; ISIT Jun. 29-Jul. 4, 2003; p. 442.
Hofri; "Disk Scheduling: FCFS vs. SSTF Revisited;" Communications of the ACM; vol. 23; No. 11; Nov. 1980; pp. 645-653.
Hong, et al.; Network-coding-based hybrid ARQ scheme for mobile relay networks; Electronics Letters; vol. 46; No. 7; Apr. 1, 2010; 2 pages.
International Disk Drive Equipment and Materials Assoc.; "Advanced Standard;" in Windows Hardware Engineering Conf.; May 2005; 11 pages.
International Preliminary Report on Patentability of the ISA for PCT/US2014/024227 dated Sep. 5 15, 2015.
Iyer, et al.; "Anticipatory scheduling: A disk scheduling framework to overcome deceptive idleness in synchronous I/O;" SIGOPS Operating Sys. Review; vol. 35; No. 5; Dec. 2001; 14 pages.
Jacobson, et al.; "Disk scheduling algorithms based on rotational position;" Hewlett-Packard laboratories; Palo Alto, CA; Technical Report HPL-CSP-91-7rev1; Feb. 26, 1991; 17 pages.
Jaggi, et al.; "Low Complexity Algebraic Multicast Network Codes;" Proceedings of the IEEE International Symposium on Information Theory; Jul. 4, 2003; 1 page.

(56) References Cited

OTHER PUBLICATIONS

Jaggi, et al.; "Resilient Network Coding in the Presence of Byzantine Adversaries;" Proc. IEEE INFOCOM; May 2007; 9 pages.
Jakubczak, et al.; "One-Size-Fits-All Wireless Video;" ACM SigComm Hotnets 2009; 6 pages.
Jamieson, et al.; "PPR: Partial Packet Recovery for Wireless Networks;" SIGCOMM 07; Aug. 27-31, 2007; 12 pages.
Jamieson, et al.; "PPR: Partial Packet Recovery for Wireless Networks;" Presentation; SIGCOMM 07; Aug. 27-31, 2007; 25 pages.
Jannaty, et al.; "Full Two-Dimensional Markov Chain Analysis of Thermal Soft Errors in Subthreshold Nanoscale CMOS Devices;" IEEE Transactions on Device and Materials Reliability; vol. 11; No. 1; Mar. 2011; pp. 50-59.
Ji, et. al; "A network coding based hybrid ARQ algorithm for wireless video broadcast;" Science China; Information Sciences; vol. 54; No. 6; Jun. 2011; pp. 1327-1332.
Jin, et al.; "Adaptive Random Network Coding in WiMAX;" Communications, 2008; ICC'08 IEEE International Conference on May 19-23, 2008; 5 pages.
Jin, et al.; "Is Random Network Coding Helpful in WiMax;" IEEE $27^{th}$ Conference on Computer Communications; Apr. 2008; 5 pages.
Jolfaei, et al.; "A New Efficient Selective Repeat Protocol for Point-To_Multipoint Communication;" Communications 1993; ICC'93 Genova Technical Program, Conference Record; IEEE International Conference on May 23-26, 1993; vol. 2; pp. 1113-1117.
Karkpinski, et al.; "New Approximation Algorithms for the Steiner Tree Problems;" Technical Report, Electronic Colloquium on Computational Complexity (ECCC) TR95-030; 1995; pp. 1-17.
Karp, et al.; "Randomized Rumor Spreading;" IEEE Proceeding FOCS '00 Proceedings of the 41st Annual Symposium on Foundations of Computer Science; Jan. 2000; pp. 565-574.
Katti, et al.; "XORs in the Air: Practical Wireless Network Coding;" IEEE/ACM Transactions on Networking; vol. 16; No. 3; 2008; pp. 1-14.
Katti, et al.; "XORs in the Air: Practical Wireless Network Coding;" ACM SIGCOMM '06; Computer Communications Review; vol. 36; Sep. 11-15, 2006; 12 pages.
Kempe, et al.; "Protocols and Impossibility Results for Gossip-Based Communication Mechanisms;" Foundations of Computer Science, Jan. 2002; Proceedings. The $43^{rd}$ Annual IEEE Symposium; pp. 471-480.
Key, et al.; "Combining Multipath Routing and Congestion Control for Robustness;" In Proceedings of IEEE CISS, 2006, 6 pages.
Kim, et al.; "Modeling Network Coded TCP Throughout: A Simple Model and its Validation;" VALUETOOLS '11 Proceedings of the $5^{th}$ International ICST Conference on Performance Evaluation Methodologies and Tools; May 16-20, 2011; 10 pages.
Kim, et al.; "Modeling Network Coded TCP Throughput: A Simple Model and its Validation", Cornell University Library, http://arxiv.org/abs/1008.0420, Aug. 2010, 3 pages.
Kim, et al.; "Network Coding for Multi-Resolution Multicast;" IEEE INFOCOM 2010; Mar. 2010; 9 pages.
Kim, et al.; "Transform-free analysis of the GI/G/1/K queue through the decomposed Little's formula;" Computers and Operations Research; vol. 30; No. 3; Mar. 2003; pp. 1-20.
Kim, et. al.; "Modeling Network Coded TCP Throughput: A Simple Model and its Validation", arXiv: 1008.0420v1 [cs.IT] Aug. 2, 2010; 9 pages.
Kim, et. al.; "Modeling Network Coded TCP Throughput: A Simple Model and its Validation", Nov. 2010, Presentation; 19 pages.
Kodialam, et al.; "Online Multicast Routing With Bandwidth Guarantees: A New Approach Using Multicast Network Flow;" IEEE/ACM Transactions on Networking; vol. 11; No. 4; Aug. 2003; pp. 676-686.
Koetter, et al.; "An Algebraic Approach to Network Coding;" IEEE/ACM Transactions on Networking; vol. 11, No. 5; Oct. 2003; pp. 782-795.
Koetter, et al.; "Beyond Routing: An Algebraic Approach to Network Coding;" IEEE Infocom; 2002; 9 pages.

Korean Notice of Preliminary Rejection (with English Reporting Letter) dated Aug. 8, 2016 corresponding to Korean Application No. 10-2015-7029104; 6 Pages.
Koutsonikolas, et al.; "Efficient Online WiFi Delivery of Layered-Coding Media using Inter-layer Network Coding;" Distributed Computing Systems (ICDCS); 2011 $31^{st}$ International Conference on Jun. 2011; 11 pages.
Koutsonikolas, et al.; "Efficient Online WiFi Delivery of Layered-Coding Media using Inter-layer Network Coding;" Distributed Computing Systems (ICDCS); 2011 $31^{st}$ International Conference on Jun. 2011; pp. 237-247.
Kritzner, et al.; "Priority Based Packet Scheduling with Tunable Reliability for Wireless Streaming;" Lecture Notes in Computer Science; 2004; pp. 707-717.
Kuhn, et al.; "Distributed Computation in Dynamic Networks;" Proc. of the $42^{rd}$ Symposium on Theory of Computing (STOC); Jun. 5-8, 2010; 10 pages.
Lai; "Sequential Analysis: Some Classical Problems and New Challenges"; Statistica Sinica, vol. 11, No. 2; 2001; pp. 303-350.
Landau; "Application of the Volterra Series to the Analysis and Design of an Angle Track Loop;" IEEE Transactions on Aerospace and Electronic Systems; vol. AES-8, No. 3; May 1972; pp. 306-318.
Larsson, et al.; "Analysis of Network Coded HARQ for Multiple Unicast Flows;" Communication (ICC) 2010 IEEE International Conference on May 23-27, 2010 pp. 1-6.
Larsson, et al.; "Multi-User ARQ;" Vehicular Technology Conference; 2006; VTC (2006-Spring); IEEE $63^{rd}$; vol. 4; May 7-10, 2006; pp. 2052-2057.
Larsson; "Analysis of Multi-User ARQ with Multiple Unicast Flows Under Non-iid Reception Probabilities;" Wireless Communication and Networking Conference 2007; WCNC 2007; IEEE; Mar. 11-15, 2007; pp. 384-388.
Larsson; "Multicast Multiuser ARQ;" Wireless Communications and Networking Conference (WCNC) 2008; IEEE; Apr. 3, 2008; pp. 1985-1990.
Le, et al.; "How Many Packets Can We Encode?—An Analysis of Practical Wireless Network Coding;" INFOCOM 2008; The $27^{th}$ Conference on Computer Communications, IEEE; 2008; pp. 1040-1048.
Lee, et al.; "Content Distribution in VANETs using Network Coding: The Effect of Disk I/O and Processing O/H;" Proc. IEEE SECON; Jan. 2008; pp. 117-125.
Lehman, et al; "Complexity Classification of Network Information Flow Problems;" SODA 04' Proceedings of the fifteenth annual ACM-SIAM symposium on Discrete algorithms; Jan. 2004; pp. 9-10.
Li, et al.; "N-in-1 Retransmission with Network Coding;" IEEE Transactions on Wireless Communications; vol. 9; No. 9; Sep. 2010; pp. 2689-2694.
Li, et al.; "Robust and Flexible Scalable Video Multicast with Network Coding over P2P Network;" $2^{nd}$ International Congress on Image and Signal Processing, IEEE: Oct. 17, 2009; pp. 1-5.
Li,et al.; "Linear Network Coding;" IEEE Transactions on Information Theory; vol. 49; No. 2; Feb. 2003; pp. 371-381.
Lima, et al.; "An Information-Theoretic Cryptanalysis of Network Coding—is Protecting the Code Enough;" International Symposium on Information Theory and its Applications; Dec. 2008; 6 pages.
Lima, et al.; "Random Linear Network Coding: A free cipher?" IEEE International Symposium on Information Theory; Jun. 2007; pp. 1-5.
Lima, et al.; "Secure Network Coding for Multi-Resolution Wireless Video Streaming;" IEEE Journal on Selected Areas in Communications; vol. 28; No. 3; Apr. 2010; pp. 377-388.
Lima, et al.; "Towards Secure Multiresolution Network Coding;" IEEE Information Theory Workshop; Jun. 12, 2009; pp. 125-129.
Liu, et al.; "The Throughput Order of Ad Hoc Networks Employing Network Coding and Broadcasting;" Military Communications Conference; MILCOM 2006; Oct. 2006; pp. 1-7.
Liu, et al.; "Using Layered Video to Provide Incentives in P2P Live Streaming;" P2P-TV07: Proceedings of the 2007 Workshop on Peer-to-peer Streaming and IP-TV; Aug. 31, 2007 ACM; 6 pages.

(56) References Cited

OTHER PUBLICATIONS

Luby, et al.; "The Use of Forward Error Correction (FEC) in Reliable Multicast;" Internet Society Request for Comments; RFC 3453; Dec. 2002; 18 pages.
Lucani et al.; "On Coding for Delay New Approaches based on Network Coding in Network Coding in Networks with Large Latency;" Presentation in NetCod; Slide Presentation; Jun. 16, 2009; 17 pages.
Lucani et al; "Broadcasting in Time-Division Duplexing: A Random Linear Network Coding Approach;" presented Switzerland; Conference: NetCod 2009, Lausanne, Switzerland; Jun. 2009; 6 pages.
Lucani et al; "On Coding for Delay—New Approaches Based on Network Coding in Networks with Large Latency;" Conference: ITA Workshop, San Diego, USA; Feb. 2009; 10 pages.
Lucani et al; "On Coding for Delay New Approaches based on Network Coding in Networks with Large Latency;" Conference ITA Workshop, San Diego, USA; Slide Presentation; Feb. 13, 2009; 11 pages.
Lucani et al; "Random Linear Network Coding for Time Division Duplexing: Energy Analysis;" Conference: ICC 2009, Dresden, Germany; Jun. 2009; 5 pages.
Lucani et al; "Random Linear Network Coding for Time-Division Duplexing: when to stop talking and start listening;" Presentation in ICC; Slide Presentation; Jun. 16, 2009; 6 pages.
Lucani et al; "Random Linear Network Coding for Time-Division Duplexing: when to stop talking and start listening;" Presentation in INFOCOM; Slide Presentation; Apr. 23, 2009; 10 pages.
Lucani et al; "Random Linear Network Coding for Time-Division Duplexing: Queueing Analysis;" Conference ISIT 2009, Seoul, Korea; Jul. 2009; 5 pages.
Lucani et al; "Random Linear Network Coding for Time-Division Duplexing: Field Size Considerations;" Conference: GLOBECOM 2009, Hawaii, USA; Dec. 2009; 6 pages.
Lucani, et al.; "Network Coding for Data Dissemination: It Is Not What You Know, But What Your Neighbors Don't Know;" Modeling and Optimization in Mobile, AdHoc, and Wireless Networks 2009; WiOPT 2009; $7^{th}$ International Symposium on Jun. 23-27, 2009; pp. 1-8.
Lucani, et al.; "Network Coding Schemes for Underwater Networks;" WUWNet 07; Sep. 14, 2007; pp. 25-32.
Lucani, et al.; Systematic Network Coding for Time-Division Duplexing; Proceedings of the IEEE International Symposium on Information Theory (ISIT); ; Jun. 13-18, 2010; pp. 2403-2407.
Lun, et al.; "Further Results on Coding for Reliable Communication over Packet Networks;" Information Theory, ISIT 2005 Proceedings International Symposium on Sep. 4-9, 2005; 5 pages.
Lun, et al.; "On Coding for Reliable Communication Over Packet Networks;" Physical Communication; vol. 1; No. 1; Jan. 2008; pp. 10 pages.
Lun, et al.; "On Coding for Reliable Communication over Packet Networks;" LIDS Publication #2741; Jan. 2007; 33 pages.
Lun, et al.; An Analysis of Finite-Memory Random Linear Coding on Packet Streams; Modeling and Optimization in Mobile, Ad Hoc and Wireless Networks; Apr. 3-6, 2006; pp. 1-6.
Lun; "Efficient Operation of Coded Packet Networks;" Ph.D. Dissertation; Massachusetts Institute of Technology; Jun. 2006; 130 pages.
Magli, et al.; "An Overview of Network Coding for Multimedia Streaming;" IEEE International Conference; Jun. 28, 2009; pp. 1488-1491.
Mallat, et al.; "Adaptive Covariance Estimation of Locally Stationary Processes;" Annals of Statistics, vol. 26, No. 1; 1998; pp. 1-43.
Manssour, et al.; "A Unicast Retransmission Scheme based on Network Coding;" IEEE Transactions on Vehicular Technology; vol. 61; Issue 2; Nov. 2011; 7 pages.
Maymounkov, et al.; "Methods for Efficient Network Coding;" Proc. of the $44^{th}$ Allerton Conference on Communication, Control, and Computing; Sep. 2006; 10 pages.
Médard, et al.; "On Coding for Non-Multicast Networks;" invited paper, $41^{st}$ Allerton Annual Conference on Communication, Control; Outgrowth of supervised student research Publications of Muriel Médard and Computing; vol. 1; Oct. 2003; 9 pages.
Medard; "Some New Directions for Network Coding in Content Distribution", RLE, EECS, MIT, Seminar to Alcatel Lucent, Nov. 2010, 29 pages.
Merchant, et al.; "Analytic Modeling of Clustered RAID with Mapping Based on Nearly Random Permutation;" IEEE Transactions on Computers; vol. 45; No. 3; Mar. 1996; pp. 367-373.
Metzner; "An Improved Broadcast Retransmission Protocol;" IEEE Transactions on Communications; vol. COM-32; No. 6; Jun. 1984; pp. 679-683.
Mosk-Aoyama, et al.; "Information Dissemination via Network Coding;" ISIT 2006; IEEE; Jul. 9-14, 2006; pp. 1748-1752.
Moyer, et al.; "A Survey of Security Issues in Multicast Communications;" IEEE Network; vol. 13; No. 6; Nov./Dec. 1999; pp. 12-23.
Nguyen, et al.; "Internet Media Streaming Using Network Coding and Path Diversity;" IEEE Global Telecommunications Conference; Nov. 30-Dec. 4, 2008; 5 pages.
Nguyen, et al.; "Wireless Broadcast Using Network Coding;" Vehicular Technology IEEE Transactions on Feb. 2009; vol. 58; Issue 2; 25 pages.
Nguyen, et al; "Video Streaming with Network Coding;" Journal of Signal Processing Systems; vol. 59, Issue 3; DOI: 10.1007/s11265-009-0342-7; Jun. 2010; 25 pages.
Nobel; "Hypothesis Testing for Families of Ergodic Processes;" Bernoulli-London, vol. 12, No. 2; 2006; 21 pages.
Noguichi, et al.; "Performance Evaluation of New Multicast Architecture with Network Coding;" IEICE Transactions on Communication, E86-B; No. 6; Jun. 2003; 3 pages.
NS Version 1—LBNL Network Simulator; web page—http://ee.lel.gov/ns/; Mar. 21, 2011; 3 pages.
Nyandoro, et al.; "Service Differentiation in Wireless LANs based on Capture;" IEEE GLOBECOM 2005; vol. 6; Dec. 2005; 5 pages.
Oliveira, et al.; "A Network Coding Approach to Secret Key Distribution;" IEEE Transactions on Information Forensics and Security; vol. 3; No. 3; pp. 414-423; Sep. 2008.
ParandehGheibi, et al.; "Access-Network Association Policies for Media Streaming in Heterogeneous Environments;" Apr. 2010; pp. 1-8.
PCT Search Report of the ISA for PCT/US 14/24227 dated Aug. 5, 2014 4 pages.
PCT Written Opinion of the ISA for PCT/US 14/24227 dated Aug. 5, 2014 5 pages.
Peng, et al.; "Research on Network Coding based Hybrid-ARQ Scheme for Wireless Networks;" Communication Systems (ICCS); 2010 IEEE International Conference on Nov. 17-19, 2010; pp. 218-222.
Popovici, et al.; "Robust, Portable I/O Scheduling with the Disk Mimic;" Proc. USENIX Annual Tech. Conf. San Antonio, Texas, Jun. 2003; 14 pages.
Qureshi, et al.; "An Efficient Network Coding based Retransmission Algorithm for Wireless Multicast;" Personal, Indoor and Mobile Radio Communications, 2009 IEEE $20^{th}$ International Symposium on Sep. 13-16, 2009; 5 pages.
Radunovic, et al.; "Horizon: Balancing TCP Over Multiple Paths in Wireless Mesh Network;" Proc. $14^{th}$ ACM International Conference on Mobile Computing and Networking; Sep. 2008; 12 pages.
Ramanathan; "Multicast Tree Generation in Networks with Asymmetric Links;" IEEE Transactions on Networking; vol. 4; Aug. 1996; pp. 1-12.
Response (with Reporting Letter in English) to Korean Preliminary Rejection dated Aug. 8, 2016 corresponding to Korean Application No. 10-2015-7029104; Response filed on Dec. 30, 2016; 39 Pages.
Rezaee, et al.; " Multi Packet Reception and Network Coding;" Presentation at the 2010 Military Communications Conference Unclassified Technical Program; Nov. 2, 2010; 15 pages.
Rezaee, et al.; "An Analysis of Speeding Multicast by Acknowledgment Reduction Technique (SMART) with Homogeneous and Heterogeneous Links—A Method of Types Approach;" Signals, Systems and Computers (ASILOMAR) 2011 Conference; IEEE; Nov. 2011; pp. 21-27.

(56) References Cited

OTHER PUBLICATIONS

Rezaee, et al.; "Speeding Multicast by Acknowledgment Reduction Technique (SMART);" ArXiv:1104.2941v2 [cs.NI] Sep. 10, 2011; 6 pages.
Rezaee, et al.; "Speeding Multicast by Acknowledgment Reduction Technique (SMART) Enabling Robustness of QoE to the Number of Users;" IEEE Journal on Selected Areas in Communication; vol. 30, No. 7; Aug. 2012; pp. 1270-1280.
Rezaee, et.al.; "Multi Packet Reception and Network Coding;" Military Communications Conference; 2010; MILCOM 2010; IEEE; Oct. 31, 2010-Nov. 3, 2010; pp. 1393-1398.
Rezaee; "Network Coding, Multi-Packet Reception, and Feedback: Design Tools for Wireless Broadcast Networks;" Submitted to Department of Electrical Engineering and Computer Science at Massachusetts Institute of Technology; Sep. 2011; 92 pages.
Riemensberger, et al.; "Optimal Slotted Random Access in Coded Wireless Packet Networks;" WiOPt 10: Modeling and Optimization in Mobile, Ad Hoc, and Wireless Networks; Jul. 13, 2010; pp. 374-379.
Roughgarden, et al.; "How Bad is Selfish Routing?" Journal of the ACM; vol. 49, No. 2; Mar. 2002; pp. 236-259.
Ruemmler, et al.; "An introduction to disk drive modeling;" IEEE Computers; vol. 27; No. 3; Mar. 17-29, 1994; 17 pages.
Ryabko, et al.; "On Hypotheses Testing for Ergodic Processes;" Information Theory Workshop; ITW'08; IEEE; 2008; pp. 281-283.
Sanders, et al.; "Polynomial Time Algorithms for Network Information Flow;" $15^{th}$ ACM Symposium on Parallel Algorithms and Architectures; Jun. 2003; pp. 1-9.
Sayenko, et al.; "Performance Analysis of the IEEE 802.16 ARQ Mechanism;" MSWiM'07; Oct. 22-26, 2007; pp. 314-322.
Scharf; "MPTCP Application Interface Considerations draft-scharf-mptcp-ap-04;" Internet Engineering Task Force; Internet-Draft; Nov. 22, 2010; 26 pages.
Seferoglu, et al.; "Opportunistic Network Coding for Video Streaming over Wireless;" Packet Video; Nov. 2007; 10 pages.
Sengupta, et al.; "An Analysis of Wireless Network Coding for Unicast Sessions: The Case for Coding-Aware Routing;" in INFOCOM 2007; $26^{th}$ IEEE International Conference on Computer Communications; Jun. 2007; 9 pages.
Servetto, et al.; "Constrained Random Walks on Random Graphs: Routing Algorithms for Large Scale Wireless Sensor Networks;" WSNA 02; Sep. 28, 2002; 10 pages.
Shenker, et al.; "Pricing in computer networks: reshaping the research agenda;" Telecommunications Policy; vol. 20, No. 3; Jan. 1996; pp. 183-201.
Sherali, et al.; "Recovery of primal solutions when using subgradient optimization methods to solve Lagrangian duals of linear programs;" Elsevier Operations Research Letters 19 (Jan. 1996); pp. 105-113.
Shields; "The Interactions Between Ergodic Theory and Information Theory;" IEEE Transactions on Information Theory, vol. 44, No. 6; Oct. 1998; pp. 2079-2093.
Shrader, et al.; "Systematic wireless network coding;" Military Conference, 2009; MILCOM 2009; IEEE; 7 pages.
Shrader, et al; "Routing and Rate Control for Coded Cooperation in a Satellite-Terrestrial Network;" IEEE: The 2011 Military Communications Conference—Track 2—Network Protocols and Performance; Nov. 7-10, 2011; pp. 735-740.
Shriver, et al.; "An analytic behavior model for disk drives with readahead caches and request reordering;" Proc. SIGMETRICS/ Performance, Joint Conf. on Meas. and Modeling Comp. Sys.; ACM; Jan. 1998; 10 pages.
Song, et al.; "Zero-Error Network Coding for Acyclic Networks;" IEEE Transactions on Information Theory; vol. 49, No. 12; Dec. 2003; pp. 3129-3139.
SongPu, et al.; Performance analysis of joint chase combining and network coding in wireless broadcast retransmission; Wireless Communication, Network and Mobile Computing 2008; WiCOM '08, $4^{th}$ International Conference on Oct. 12-14, 2008; pp. 1-4.
Soo Suh; "Send-on-Delta Sensor Data Transmission With a Linear Predictor;" Sensors; ISSN 1424-8220; vol. 7; No. 4; Apr. 26, 2007; pp. 537-547.
Sun, et al.; "Cooperative Hybrid-ARQ Protocol with Network Coding;" Communications and Networking in China 2009—ChinaCOM 2009; Fourth International Conference on Aug. 26-28, 2009; pp. 1-5.
Sundaram, et al.; "Multirate Media Streaming Using Network Coding;" Proc. $43^{rd}$ Allerton Conference on Communication, Control, and Computing; Sep. 2005; 7 pages.
Sundararajan, et al.; "ARQ for Network Coding;" ISIT Proc. of the IEEE International Symposium on Information Theory (ISIT); Jul. 6-11, 2008; pp. 1651-1655.
Sundararajan, et al.; "Network Coding Meets TCP: Theory and Implementation;" Proceedings of the IEEE; vol. 99, Issue 3; Mar. 2011; pp. 490-512.
Sundararajan, et al.; "Network coding meets TCP;" InfoCOM 2009; IEEE, Apr. 19-25, 2009; pp. 280-288.
Sundararajan, et al.; On Queueing in Coded Networks—Queue Size Follows Degrees of Freedom; IEEE Information Theory Workshop on Information Theory for Wireless Networks (ITW); Jul. 1-6, 2007; 6 pages.
Teerapittayanon, et al.; "Network Coding as a WiMAX Link Reliability Mechanism;" Multiple Access Communication; Lectures Notes in Computer Science; vol. 7642; pp. 1-12; 2012.
Teerapittayanon, et al.; "Performance Enhancements in Next Generation Wireless Networks Using Network Coding: A Case Study in WiMAX;" Massachusetts Institute of Technology; Jun. 2012; 130 pages.
Thobaben; "Joint Network/Channel Coding for Multi-User Hybrid-ARQ;" Source and Channel Coding (SCC) 2008; $7^{th}$ International ITG Conference on Jan. 14-16, 2008; 6 pages.
Tosun, et al.; "Efficient Multi-Layer Coding and Encryption of MPEG Video Streams;" Proc. 2000 IEEE International Conference on Multimedia and Expo; vol. 1; 2000; pp. 119-122.
Tosun, et al.; "Lightweight Security Mechanisms for Wireless Video Transmission;" Proc. Intl. Conference on Information Technology, Coding and Computing; Apr. 2001; pp. 157-161.
Tran, et al.; "A Hybrid Network Coding Technique for Single-Hop Wireless Networks;" IEEE Journal on Selected Areas in Communications; vol. 27; No. 5; Jun. 2009; pp. 685-698.
Tran, et al.; "A Joint Network-Channel Coding Technique for Single-Hop Wireless Networks;" Network Coding, Theory and Applications; 2008; NetCod 2008; Fourth Workshop on Jan. 3-4, 2008; pp. 1-6.
Trung, et al.; "Quality Enhancement for Motion JPEG Using Temporal Redundancies;" IEEE Transactions on Circuits and System for Video Technology, vol. 18; No. 5; May 2008; pp. 609-619.
Tsatsanis, et al.; "Network Assisted Diversity for Random Access Wireless Data Networks;" Signals, Systems & amp; Computers; IEEE; vol. 1; Nov. 1-4, 1988; pp. 83-87.
Valancius, et al.; "Greening the Internet with Nano Data Centers;" Proc. $5^{th}$ International Conference on Emerging Networking Experiments and Technologies; CoNEXT 2009; ACM 2009; Dec. 1-4, 2009; pp. 37-48.
Vasudevan, et al.; "Algebraic Gossip on Arbitrary Networks;" arXiv:0901.1444; Jan. 2009; 5 pages.
Velambi, et al.; "Throughput and Latency in Finite-Buffer Line Networks;" IEEE Transactions on Information Theory; vol. 57; No. 6; Jun. 2011; pp. 3622-3643.
Vien, al.; "Network Coding-based Block ACK for Wireless Relay Networks;" Proceedings of IEEE Vehicular Technology Conference (VTC2011-Spring); May 2011; 5 pages.
Vien, et al.; "Network Coding-based ARQ Retransmission Strategies for Two-Way Wireless Relay Networks;" Software, Telecommunications and Computer Networks (SoftCOM) 2010; International Conference on Sep. 23-25, 2010; 5 pages.
Vilela, et al.; "Lightweight Security for Network Coding;" IEEE International Conference on Communications; May 2008; 5 pages.
Wang, et al.; "Capacity-Delay Tradeoff for Information Dissemination Modalities in Wireless Networks;" in Information Theory; ISIT 2008; IEEE International Symposium; Jul. 2008; pp. 677-681.

(56) References Cited

OTHER PUBLICATIONS

Wang, et al.; "Embracing Interference in Ad Hoc Networks Using Joint Routing and Scheduling with Multiple Packet Reception;" in INFOCOM 2008; The 27$^{th}$ Conference on Computer Communications; IEEE; Apr. 2008; pp. 1517-1525.
Wang, et al.; Multipath Live Streaming via TCP: Scheme, Performance and Benefits; ACM Transactions on Multimedia Computing, Communications and Applications; vol. 5; No. 3; Article 25; Aug. 2009; pp. 1-23.
Widmer, et al.; "Network Coding for Efficient Communication in Extreme Networks;" Applications, Technologies, Architectures, and Protocols for Computer Communication; Aug. 2005; pp. 284-291.
Wieselthier, et al.; "Energy Efficient Broadcast and Multicast Trees in Wireless Networks;" Mobile Networks and Applications 7; Jan. 2002; pp. 481-492.
Wieselthier, et al.; "Energy-Aware Wireless Networking with Directional Antennas: The Case of Session-Based Broadcasting and Multicasting;" IEEE Transactions on Mobile Computing; vol. 1, No. 3; Jul.-Sep. 2002; pp. 176-191.
Wilhelm; "An Anomaly in Disk Scheduling: A Comparison of FCFS and SSTF Seek Scheduling Using an Empirical Model for Disk Access;" Communications of the ACM, vol. 19; No. 1; Jan. 1976; pp. 13-17.
Wu, et al.; "A Trellis Connectivity Analysis of Random Linear Network Coding with Buffering;" Proc. of the International Symposium on Information Theory (ISIT); Jul. 9-14, 2006; pp. 768-772.
Yazdi, et al.; "Optimum Network Coding for Delay Sensitive Applications in WiMAX Unicast;" IEEE INFOCOM 2009; Apr. 19-25, 2009; pp. 1576-2580.
Yeung; "Multilevel Diversity Coding with Distortion;" IEEE Transactions on Information Theory; vol. 41, No. 2; Mar. 1995; pp. 412-422.
Yong, et al.; "XOR Retransmission in Multicast Error Recovery;" Networks 2000; ICON; Proceedings IEEE International Conference on Sep. 5-8, 2000; pp. 336-340.
Yoon et al., "Video-Aware Prioritized Network Coding Over MIMO Relay Networks," (with English Abstract); The Journal of the Korean Institute of Communication Sciences, vol. 37A, No. 9; Sep. 2012; pp. 746-752; 7 Pages.
Yun, et al.; "High-Throughput Random Access Using Successive Interference Cancellation in a Tree Algorithm;" IEEE Transactions on Information Theory; vol. 53; No. 12; Dec. 2007; pp. 4628-4639.
Yun, et al.; Towards Zero Retransmission Overhead: A Symbol Level Network Coding Approach to Retransmission; IEEE Transactions on Mobile Computing; vol. 10; No. 8; Aug. 2011; pp. 1083-1095.
Zeger; "Packet Erasure Coding with Random Access to Reduce Losses of Delay Sensitive Multislot Messages;" IEEE; Paper ID #900482; Aug. 18, 2009; pp. 1-8.
Zeng et al., "An Effective Network Coding Strategy With Scalable Video Coding for Peer-to-Peer Streaming;" Intelligent Automation & Soft Computing, vol. 17 No. 8; Jan. 2011; pp. 1139-1151; 13 Pages.
Zhang, et al.; "Collision Resolution in Packet Radio Networks Using Rotational Invariance Techniques;" IEEE Transactions on Communication; vol. 50; No. 1; Jan. 2002; pp. 146-155.
Zhang, et al.; "Optimized Multipath Network Coding in Loss Wireless Networks;" ICDCS '08 Proceedings of the 2008 the 28$^{th}$ International Conference on Distributing Computing Systems; Jan. 2008; 12 pages.
Zhang, et al.; Dual XOR in the AIR: A Network Coding Based Retransmission Scheme for Wireless Broadcasting; Communications (ICC) 2011 IEEE International Conference on Jun. 5-9, 2011; pp. 1-6.
Zhao, et al.; "A Multiqueue Service Room MAC Protocol for Wireless Networks With Multipacket Reception;" IEEE/ACM Transactions on Networking; vol. 11; No. 1; Feb. 2003; pp. 125-137.
Zhao, et al.; "On analyzing and improving COPE performance;" Information Theory and Applications Workshop (ITA), Jan. 2010; pp. 1-6.
Zhu, et al.; "Multicast with Network Coding in Application-Layer Overlay Networks;" IEEE Journal on Selected Areas in Communications; vol. 22; No. 1; Jan. 2004; pp. 1-13.
Nazir, et al.; "Application Layer Systematic Network Coding for Sliced H.264/AVC Video Streaming;" Research Article; Hindawi Publishing Corporation; Advances in Multimedia 2012 vol. 2012; Article ID 916715; Apr. 5, 2012; 10 pages.
Office Action dated Oct. 22, 2015 for U.S. Appl. No. 13/965,721; 43 pages.
Response to Oct. 22, 2015 Office Action for U.S. Appl. No. 13/965,721, filed Jan. 22, 2016; 39 pages.
Office Action dated May 9, 2016 for U.S. Appl. No. 13/965,721; 19 pages.
Response to May 9, 2016 Office Action for U.S. Appl. No. 13/965,721, filed Nov. 2, 2016; 9 pages.
Notice of Allowance dated Nov. 16, 2017 for U.S. Appl. No. 13/965,721; 16 pages.
Response to Extended European Search Report dated Aug. 25, 2016 corresponding to European Appl. No. 14776152.2 as filed on Mar. 6, 2017; 10 pages.
Supplemental Response to Extended European Search Report dated Aug. 25, 2016 corresponding to European Appl. No. 14776152.2 as filed on Apr. 27, 2017; 10 pages.
Translation of Japanese Office Action dated Jan. 10, 2017 for Japanese Appl. No. 2016-501443; 3 pages.
Notice of Allowance (with English version of Allowed Claims) for Korean Patent Appl. No. 10-2015-7029104 dated Jul. 7, 2017; 7 pages.
Response to Jan. 10, 2017 Japanese Office Action (with translated claims) as filed in the Japanese Patent Office on Jul. 10, 2017 for Japanese Appl. No. 2016-501443; 11 pages.
Chinese Office Action with Translation for Chinse Appl. No. 201480013961.4 dated Nov. 10, 2017; 15 pages.
Zeng, et al.; "An Effective Network Coding Strategy with Scalable Video Coding for Peer-to-Peer Streaming;" Intelligent Automation & Soft Computing; vol. 17; No. 8; pp. 1139-1151; Jan. 2011; 14 pages.
Letter dated Jan. 5, 2018 from Japanese Associate Regarding Jan. 4, 2018 Allowance Report with Translation of Claims for Japanese Application No. 2016-501443; 5 pages.
Translation of Response to Nov. 10, 2017 Chinese Office Action as filed on Mar. 20, 2018 for Chinese Appl. No. 201480013961.4; 5 pages.
Response to European Examination Report dated Jun. 8, 2018 for European Appl. No. EP14776152.2 as filed on Oct. 3, 2018; 30 pages.
European Examination Report dated Jun. 8, 2018 for European Appl. No. EP14776152.2; 6 pages.
Chinese Notice of Granting Patent Right for Invention dated Nov. 30, 2018 for Chinese Appl. No. CN201480013961.4; 6 pages.
Notice of Allowance dated Jul. 10, 2019 for U.S. Appl. No. 15/427,536; 38 pages.
Minutes of the Oral Proceedings in Accordance with Rule 124(4) EPC dated Oct. 29, 2019 for European Application No. 14776152.2; 10 Pages.
Intention to Grant dated Nov. 4, 2019 for European Application No. 14776152.2; 7 Pages.

\* cited by examiner

NETWORK CODED STORAGE WITH MULTI-RESOLUTION CODES

CROSS REFERENCE TO RELATED APPLICATION

The present application is a continuation of co-pending U.S. patent application Ser. No. 15/427,536 filed on Feb. 8, 2017, which is a continuation of U.S. patent application Ser. No. 13/965,721 filed on Aug. 13, 2013, which claims the benefit of U.S. Provisional Application Ser. No. 61/783,522 filed on Mar. 14, 2013, which applications are all hereby incorporated by reference herein in their entireties.

GOVERNMENT RIGHTS

This invention was made with government support under Contract No. W911NF-07-1-0029 awarded by the Army Research Office and under Contract No. HR0011-10-3-0002 awarded by the Defense Advanced Research Projects Agency. The government has certain rights in the invention.

FIELD

Subject matter disclosed herein relates generally to data storage and, more particularly, to data storage techniques and structures that utilize coding.

BACKGROUND

Over the last decade there has been a large increase in demand for video-streaming services. These streaming services are often provided by content distribution networks that utilize one or more data centers to facilitate content delivery. Each data center will typically include a large array of hardware that enables the data center to service a large number of users concurrently in a reliable manner. Nonetheless, there will typically be a limit to the number of user requests that a data center can service at a given time. Once a data center has reached its limit, it will not be able to service subsequently received user requests until past service requests are completed. As will be appreciated, frequent or recurring service denials in a data center can damage the reputation of the data center as a service provider. Techniques are therefore needed for reducing the probability of service denials within data centers, content distribution networks, and similar systems. Techniques are also needed for enhancing a level of service provided to users associated with data centers and content distribution networks.

SUMMARY

In accordance with one aspect of the concepts, systems, circuits, and techniques described herein, a method is provided for storing files within a plurality of disk drives in a system that uses multi-resolution coding. More specifically, the method comprises: storing a base layer of a first file on each of a first set of disk drives in the plurality of disk drives; and storing a linear combination of the base layer of the first file and a first refinement layer of the first file on each of a second set of disk drives in the plurality of disk drives.

In one embodiment, storing a linear combination of the base layer and the first refinement layer on each of the second set of disk drives includes generating a linear combination for each of the second set of disk drives using different random coefficients.

In one embodiment, storing a linear combination of the base layer and the first refinement layer on each of the second set of disk drives includes storing the different random coefficients with each linear combination on each of the second set of disk drives.

In one embodiment, the first set of disk drives and the second set of disk drives have no disk drives in common.

In one embodiment, the method further comprises storing a linear combination of the base layer of the first file, the first refinement layer of the first file, and a second refinement layer of the first file on each of a third set of disk drives in the plurality of disk drives.

In one embodiment, the method is implemented in a data center associated with a content distribution network.

In one embodiment, the method further comprises: storing a base layer of a second file on each of the first set of disk drives in the plurality of disk drives; and storing a linear combination of the base layer of the second file and a first refinement layer of the second file on each of the second set of disk drives in the plurality of disk drives.

In one embodiment, the first file includes a video file.

In accordance with another aspect of the concepts, systems, circuits, and techniques described herein, a system comprises: a plurality of disk drives; and a controller to store files on the plurality of disk drives in multiple different resolutions using a multi-resolution code, the controller being configured to store a base layer of a first file on each of a first group of disk drives in the plurality of disk drives and a linear combination of the base layer of the first file and a first refinement layer of the first file on each of a second group of disk drives in the plurality of disk drives.

In one embodiment, the controller is configured to store a linear combination of the base layer of the first file, a first refinement layer of the first file, and a second refinement layer of the first file on each of a third group of disk drives in the plurality of disk drives.

In one embodiment, the controller is configured to: generate the linear combination for each of the second set of disk drives using different random coefficients; and store the random coefficients on each of the second set of disk drives in association with the corresponding linear combination.

In one embodiment, the controller is configured to store a linear combination of the base layer of the first file, the first refinement layer of the first file, and a second refinement layer of the first file on each of a third set of disk drives in the plurality of disk drives.

In one embodiment, the system further comprises a plurality of servers for use in servicing requests from users, wherein the plurality of disk drives are associated with a first server in the plurality of servers.

In one embodiment, each server in the plurality of servers is associated with a different plurality of disk drives.

In one embodiment, the plurality of servers are configured to service requests for video streaming services from users.

In one embodiment, the first file includes a first video file.

In one embodiment, the system is part of a data center associated with a content distribution network.

In one embodiment, the controller is configured to retrieve files from the plurality of disk drives in response to user requests, the controller to receive a user request for the first file at a next to lowest resolution and, in response thereto, retrieve a first linear combination of the base layer associated with the first file and the first refinement layer associated with the first file from a disk drive in the second group of disk drives, and retrieve either a base layer associated with the first file from a disk drive in the first group of disk drives or a second linear combination of the base layer associated with the first file and the first refinement layer associated with the first file from another disk drive in the second group of disk drives.

In one embodiment, the controller is configured to deliver data to the user that is based on the information retrieved from the plurality of disk drives.

In accordance with a still another aspect of the concepts, systems, circuits, and techniques described herein, a method is provided for processing a user request for a first file in a system that uses multi-resolution coding to store files at multiple different resolutions within multiple disk drives, the system having a first group of disk drives storing a base layer associated with the first file and a second group of disk drives storing a linear combination of the base layer associated with the first file and a first refinement layer associated with the first file. More specifically, the method comprises: receiving a request for the first file at a next to lowest resolution from a user; retrieving a first linear combination of the base layer associated with the first file and a first refinement layer associated with the first file from a disk drive in the second group of disk drives; retrieving either a base layer associated with the first file from a disk drive in the first group of disk drives or a second linear combination of the base layer associated with the first file and the first refinement layer associated with the first file from another disk drive in the second group of disk drives; and sending data to the user that is based on the first linear combination and either the base layer or the second linear combination to the user.

In one embodiment, the method further comprises sending a request denial message to the user if none of the second group of disk drives is available for use when the received request is processed.

In one embodiment, the method further comprises: receiving a request for the first file at a lowest resolution from a user; retrieving the base layer associated with the first file from a disk drive in the first group of disk drives in response to the request; and sending the retrieved base layer to the user in response to the request.

BRIEF DESCRIPTION OF THE DRAWINGS

The foregoing features may be more fully understood from the following description of the drawings in which.

DETAILED DESCRIPTION

Figure 1:
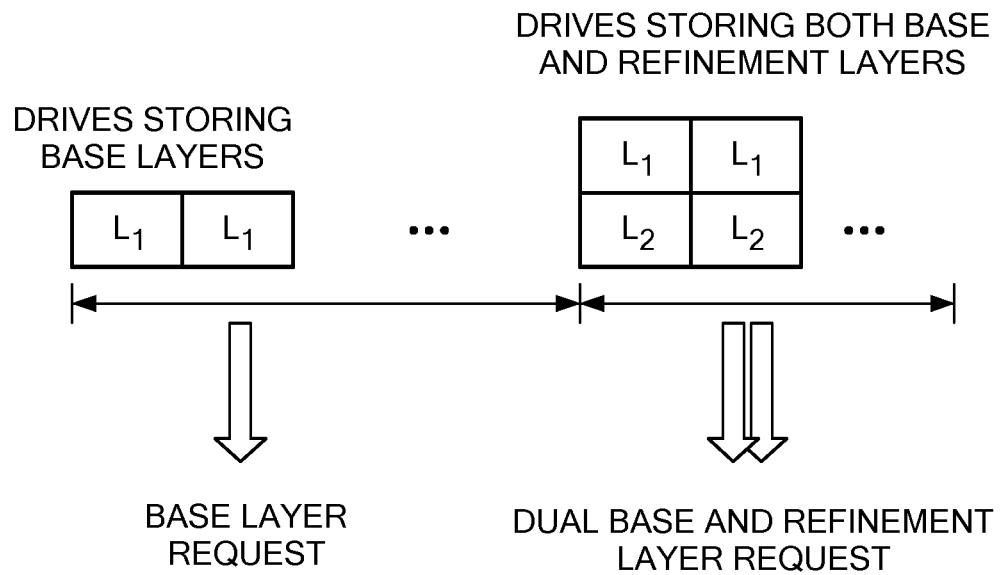
FIG. 1 is a diagram illustrating a technique for storing multi-resolution coded files within a plurality of disk drives.

Techniques, devices, and systems are described herein for providing systematic network coded storage for video files and/or other files using multi-resolution codes. These techniques, devices, and systems may be used in a wide variety of different applications and are particularly well suited for use in data center-based video-streaming applications. It has been shown that data centers using systematic network coded storage with multi-resolution codes are capable of achieving a lower saturation probability than those using uncoded storage under a wide variety of network conditions. These conditions may include variations in server load, storage allocation between layers, and/or arrival request-type ratios. In some implementations, saturation probabilities can be reduced by more than an order of magnitude using systematic network coded storage techniques with multi-resolution codes. Systematic network coded storage may also be used to reduce drive infrastructure requirements within a data center.

System saturation is a condition where a system is not presently able to service any new user requests. To reduce problems with saturation, many content distribution networks (CDNs) replicate content throughout the network. This replication of content may include, for example, replication of a particular file in multiple locations within a data center associated with a CDN (e.g., the same file being stored within different disk drives of the data center). In this manner, when a request for the file is received at the data center, if a first disk drive that contains the file is unavailable (i.e., it is currently servicing one or more other requests), then the same content may still be available from one or more other drives. As long as the file is available from at least one drive, the request can be serviced and does not need to be denied.

A wide variety of different user device types are now available that enable users to access streaming video services from CDNs. Such devices include, for example, smart phones, tablets and other computers, multi-media devices, and others. The video resolutions enabled by popular devices currently span a relatively wide range from 360p to HD 1080p. This diversity of devices and resolution levels can complicate video file replication strategies within data centers. The file replication technique that is used within a data center should take into account both video resolution diversity and saturation probability reduction.

Multi-resolution codes have been proposed as a means to manage video resolution diversity in data centers. A multi-resolution code is a single code that can be read at different rates, yielding reproductions at different resolutions. Multi-resolution codes typically include a base layer to provide a lowest video resolution and one or more refinement layers to provide additional resolution. For example, an H.264 or Silverlight 480p version of a video may be encoded using a 380p base layer and one or more refinement layers. When a multi-resolution code is being used, a user may determine how many layers to request based on, for example, their video resolution preferences and/or available communication bandwidth.

In modern systems, different groups of layers of a multi-resolution video are often stored on different drives within a data center. Thus, some disk drives may store just the base layer of the video, others may include the base layer and a first refinement layer, still others may include the base layer and first and second refinement layers, and so on. This technique is illustrated in FIG. 1 for a system that provides two different video resolutions. As illustrated, if a user requests the lowest resolution of a particular video (see left side of FIG. 1), a disk drive may be selected that only stores the base layer of the video. The base layer may then be retrieved from the selected drive and delivered to the user.

In some streaming applications, the retrieval and delivery of the file may both be part of a single continuous process until the entire file has been delivered or the process is otherwise terminated.

If the user requests the higher resolution of the video (see right side of FIG. 1), a disk drive may be selected that stores both the base layer and the first refinement layer. The base layer and the first refinement layer may then be retrieved and decoded and the resulting higher resolution file is delivered to the user. If a lower resolution request is received, and none of the drives that include only the base layer are available, the request may be denied. Likewise, if a request for the higher resolution is received, and none of the drives that include the base layer and the first refinement layer are available, the request may also be denied.

Decoding a refinement layer with a higher resolution will typically require decoding the corresponding base layer and all lower refinement layers. Thus, a base layer will always be in demand whenever a video of any resolution is requested. If a system stores too few base layers, it risks the base layer drives becoming overwhelmed by user requests, causing a high system saturation probability. If a system instead allocates more drives for base layers at the expense of refinement layers, it risks reducing or restricting users' quality of experience.

As described previously, there will typically be a limit to the number of user requests that a data center will be able to service at a given time. In various embodiments described herein, user video requests will typically identify a video resolution desired by the user. As used herein, a system will be referred to as being in a "saturated" state (or simply "saturated") if the system is not presently able to service any new user requests in any supported resolution. Likewise, the term "saturation probability" (or $P_s$) will be used to describe the steady state probability that a system is in a saturated state.

Network coding is a technique where data is encoded by generating linear combinations of data elements. These linear combinations may later be "decoded" to extract the original data elements assuming a sufficient number of linear combinations (and/or original data elements) are available as degrees of freedom. One popular form of network coding is known as random linear network coding (RLNC). Using RLNC, data elements are linearly combined using randomly generated coefficients. If a different set of randomly generated coefficients is used to generate different linear combinations, the linear combinations will typically be linearly independent of one another (i.e., innovative) and will thus represent a degree of freedom for use in decoding.

A systematic code is a code where the original uncoded data is made part of the encoded output. Systematic network coding is a systematic code that includes some or all of the original uncoded data with the linear combinations of data (i.e., the network coded data). As will be described in greater detail, in some embodiments, systematic network coded storage is used to store multi-resolution coded files in a data center. The network coded storage is "systematic" because some of the data (e.g., the base layer) associated with a multi-resolution video file is stored in an uncoded form in the disk drives along with network coded versions of higher resolution layers.

Figure 2:
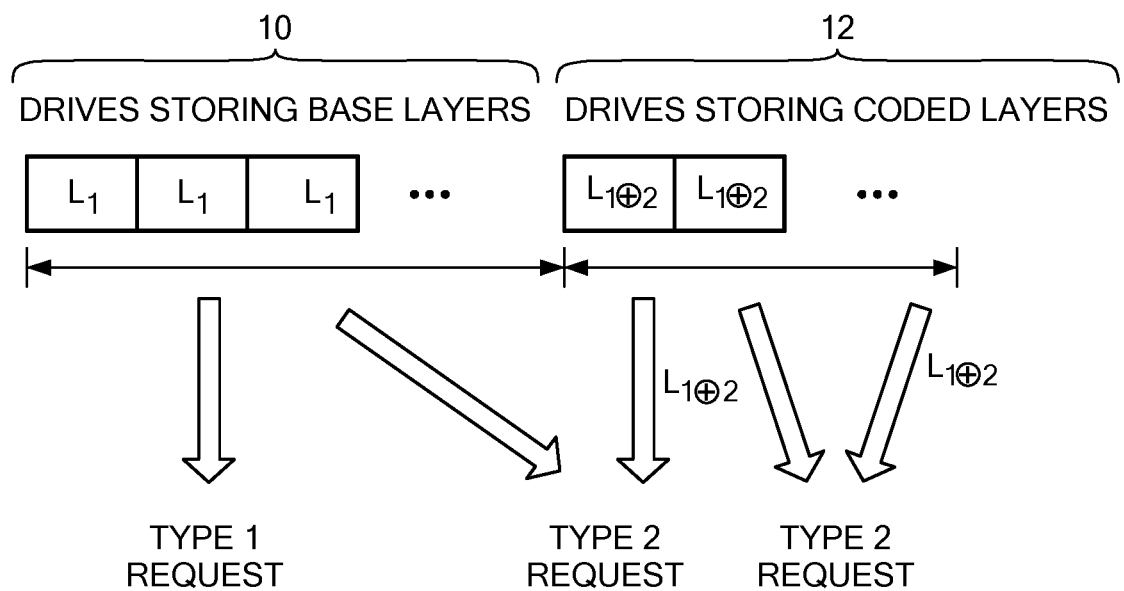
FIG. 2 is a diagram illustrating an exemplary technique for storing multi-resolution coded files within a plurality of drives using systematic network coded storage in accordance with an embodiment.

FIG. 2 is a diagram illustrating a technique for storing multi-resolution coded files within a plurality of drives using systematic network coded storage in accordance with an embodiment. The technique may be used within, for example, data centers and/or other systems. In the description that follows, the technique is described in the context of a system that supports two different resolutions. It should be appreciated, however, that the technique may be easily extended to systems having a higher number of available resolutions. With reference to FIG. 2, a first group of drives 10 is provided that each store a base layer ($L_1$) associated with a given multi-resolution coded video file in a non-network coded form. A second group of drives 12 is also provided that each store a linear combination ($L_{1 \oplus 2}$) of the base layer ($L_1$) and a first refinement layer ($L_2$) of the multi-resolution coded video file. The base layer ($L_1$) and the first refinement layer ($L_2$) may be equal-rate layers (having a rate $B_0$) in some implementations. The linear combinations may be computed as follows:

$$L_{1 \oplus 2} = \sum_{i=1}^{N} a_i L_i$$

where $a_i$ are the random coefficients and $L_i$ are the multi-resolution code layers. Different random coefficients may be used for each linear combination to be stored in the second group of drives. In some implementations, a random number generator may be used to generate the random coefficients. The random coefficients may be stored in association with the linear combination in each corresponding drive (e.g., as metadata or some other type of associated data).

As before, a user may request a video file from the data center in either the lower resolution or the higher resolution. If the user requests the file in the lower resolution, the system may check the first group of drives 10 to determine whether any of the drives have enough bandwidth available to service the request. If so, an available drive may be selected from the first group of drives and the base layer of the requested file may be retrieved from the drive and delivered to the user. If the user requests the file with the higher resolution, the system may check the second group of drives 12 to determine whether any of those drives have sufficient bandwidth available to service the request. If so, an available drive may be selected from the second group of drives and a linear combination may be retrieved therefrom.

The linear combination retrieved from the second group of drives will not be useable until it is decoded, and decoding requires additional information (i.e., additional degrees of freedom). This additional information can be provided by either retrieving a base layer from the first group of drives 10 or by retrieving another linear combination from another one of the drives in the second group of drives 12. Either of these two sources will provide the degrees of freedom needed to decode the network coded information. The decoding can be performed at either the data center or at the user location. If performed at the user location, the additional benefits of using network coding during signal transmission may also be achieved. Any technique for decoding network coded information may be used. After the base layer and the first refinement layer of the requested video file have been extracted, the files may be further processed to remove the multi-resolution coding to generate the final higher resolution version of the requested file suitable for playback. This may also be performed at either the data center or the user location.

The above-described technique can reduce the probability of saturation in a data center or similar facility. For example, if the user submits a request for the higher resolution of a video, a first file may be retrieved from the second group of drives 12, and a second file may be retrieved from either the first or the second group of drives 10, 12. Because a larger number of drives can be used to retrieve the second file, the chance that the higher resolution request will be denied is reduced. In one possible approach, after retrieving a first linear combination from the second group of drives 12, the system may determine whether another drive is available in the second group 12. If so, a second linear combination may be retrieved. If another drive is not available in the second group, the system may then determine whether a drive is available in the first group of drives 10. If so, a base layer L1 may be retrieved. Other techniques for retrieving the two files may be used in other embodiments.

The above-described technique may be extended for use in systems that support more than two resolutions. In the discussion that follows, a request for a lowest resolution of a file will be referred to as a Type 1 request, a request for a next lowest resolution of a file will be referred to as a Type 2 request, and so on. In a three resolution system, a third group of drives may be provided that each store a linear combination of a base layer, a first refinement layer, and a second refinement layer of a given file. As before, a different set of random coefficients may be used for each linear combination stored. The coefficients may be stored along with the linear combinations in some embodiments. In a three resolution system, a Type 3 request may be processed by retrieving three files from the disk drives. One of the retrieved files must be retrieved from the third group of drives, a second file can be retrieved from either the second group of drives or the third group of files, and the third file can be retrieved from the first, second, or third group of files. Again, this approach can lead to a reduction in the number of service denials and in the saturation probability within the system. Additional resolution layers may be added in a similar manner.

Figure 3:
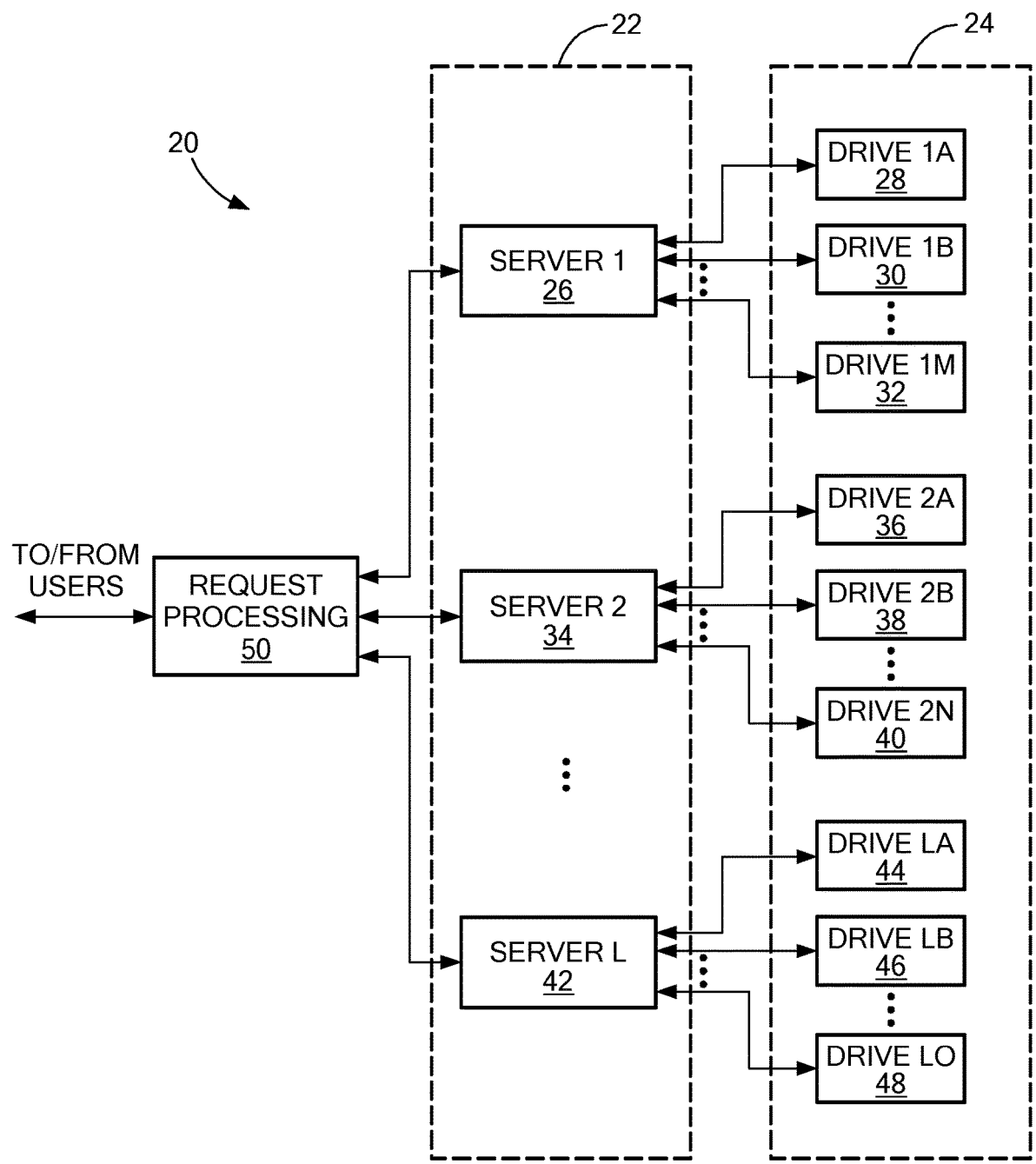
FIG. 3 is a block diagram illustrating an exemplary architecture that may be used within a data center or similar system to provide systematic network coded storage with multi-resolution coding in accordance with an embodiment.

FIG. 3 is a block diagram illustrating an architecture 20 that may be used within a data center or similar facility in accordance with an embodiment. The data center may be coupled to a network for use in receiving requests from users for, for example, video streaming services. The network can include, for example, a private network, a public network, the Internet, a wireless network, a wired network, a network having both wireless and wired links, or any other type of network or communication medium capable of providing access to the data center for a plurality of users. As shown, the architecture 20 may include a plurality of servers 22 and a plurality of disk drives 24. Each server may be associated with a corresponding set of disk drives within the plurality of disk drives. For example, as shown in FIG. 3, server 26 may be associated with drive 28, drive 30, and drive 32; server 34 may be associated with drive 36, drive 39, and drive 40; and server 42 may be associated with drive 44, drive 46, and drive 48. Any number of servers may be provided and any number of drives may be associated with each server. Each server may only be capable of accessing its associated drives.

Architecture 20 may also include a request processing unit 50 for receiving and processing requests from users for video files (and/or other types of files). The request processing unit 50 may receive requests from users at an input thereof via, for example, an external network. Each user request may indicate, for example, a desired file and a corresponding resolution. In at least one embodiment, each video file stored within a data center having architecture 20 may only be replicated within drives associated with a single server. In such an embodiment, request processing unit 50 may determine which server has the requested file and then forward the request to that server.

In some embodiments, the drives associated with a particular server may be divided into resolution based groups for a particular file, as described previously. That is, the drives may include: a first group of drives that each store only MRC base layers of the file, a second group of files that each store only a linear combination of the MRC base layer of the file and a first MRC refinement layer of the file, and so on. The total number of drives associated with a server that have some information about a particular file does not have to include all drives in the group. That is, in some embodiments, one or more drives associated with a server may have no information about a corresponding file associated with the server. In some embodiments, there will be no common elements between the different groups associated with a particular file. Thus, each drive that includes a linear combination of a base layer and a first refinement layer associated with a first file may not also store a separate copy of the base layer in uncoded form. In other embodiments, there may be some cross-over between the different groups. In at least one arrangement, individual drives will be able to store uncoded base layers for some files and linear combinations for other files. That is, drives may or may not be limited to a single layer type for all files.

The number of drives within each group associated with a file will depend on a cost function in some implementations. The ratio of drives storing different layers may be optimized to reduce saturation probability using, for example, analytical models, numerical simulations, testbed implementations, and/or other optimization strategies. In general, the system saturation probability may depend upon parameters such as, for example, the number of drives associated with a server (m), the number of drives associated with each layer ($m_i$), the access bandwidth of each drive (B), the data rate associated with each layer ($B_0$), and/or other factors.

After a user request has been forwarded to a server, the server may identify the relevant groups of drives associated with the file. The server may have this group information stored locally or it may receive the information from request processing unit 50 or some other location. If, for example, a Type 1 request is received, the corresponding server may determine which drives store copies of the non-network-coded base layer of the file. If one or more of these drives have sufficient bandwidth available, the server may then retrieve the base layer from the available drive and deliver it to the requesting user. If a Type 2 request is received, the corresponding server may determine which drives store linear combinations of the base layer of the file and the first refinement layer as well as which drives store copies of the non-network-coded base layer of the file. The server may then retrieve a first linear combination and either an uncoded base layer or another linear combination from the corresponding drive groups (assuming drive availability). This information may then be delivered to the requesting user.

Figure 4:
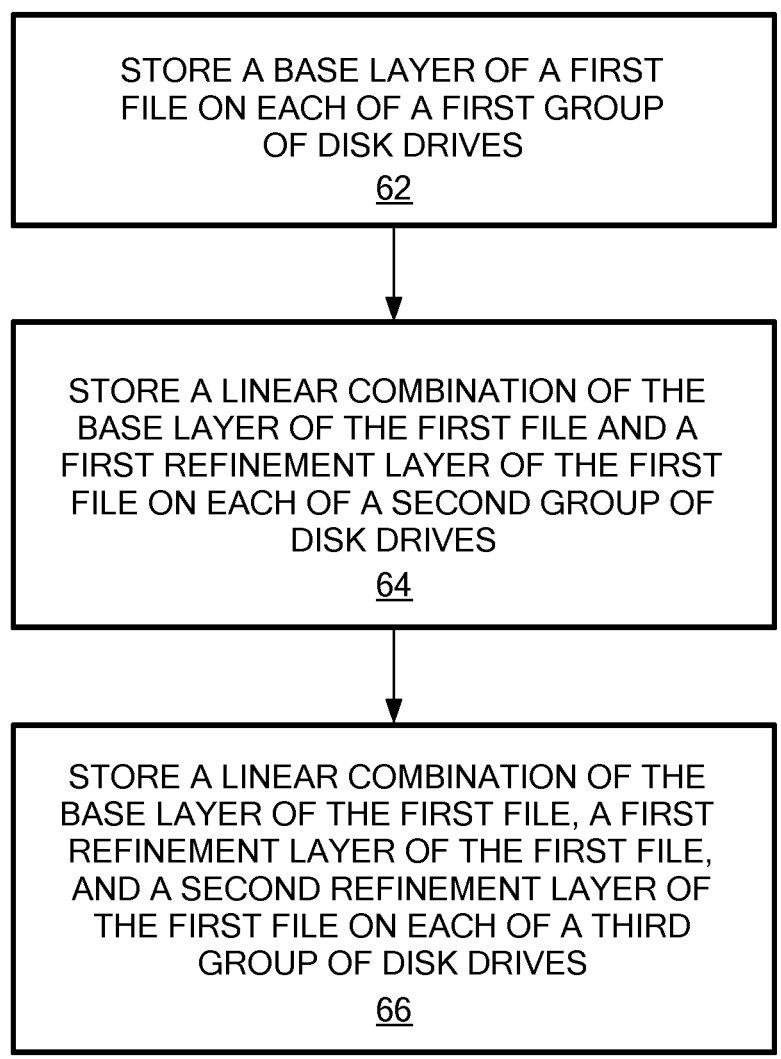
FIG. 4 is a flow diagram illustrating an exemplary method for storing multi-resolution encoded files within a plurality of disk drives using systematic network coded storage in accordance with an embodiment.
Figure 5:
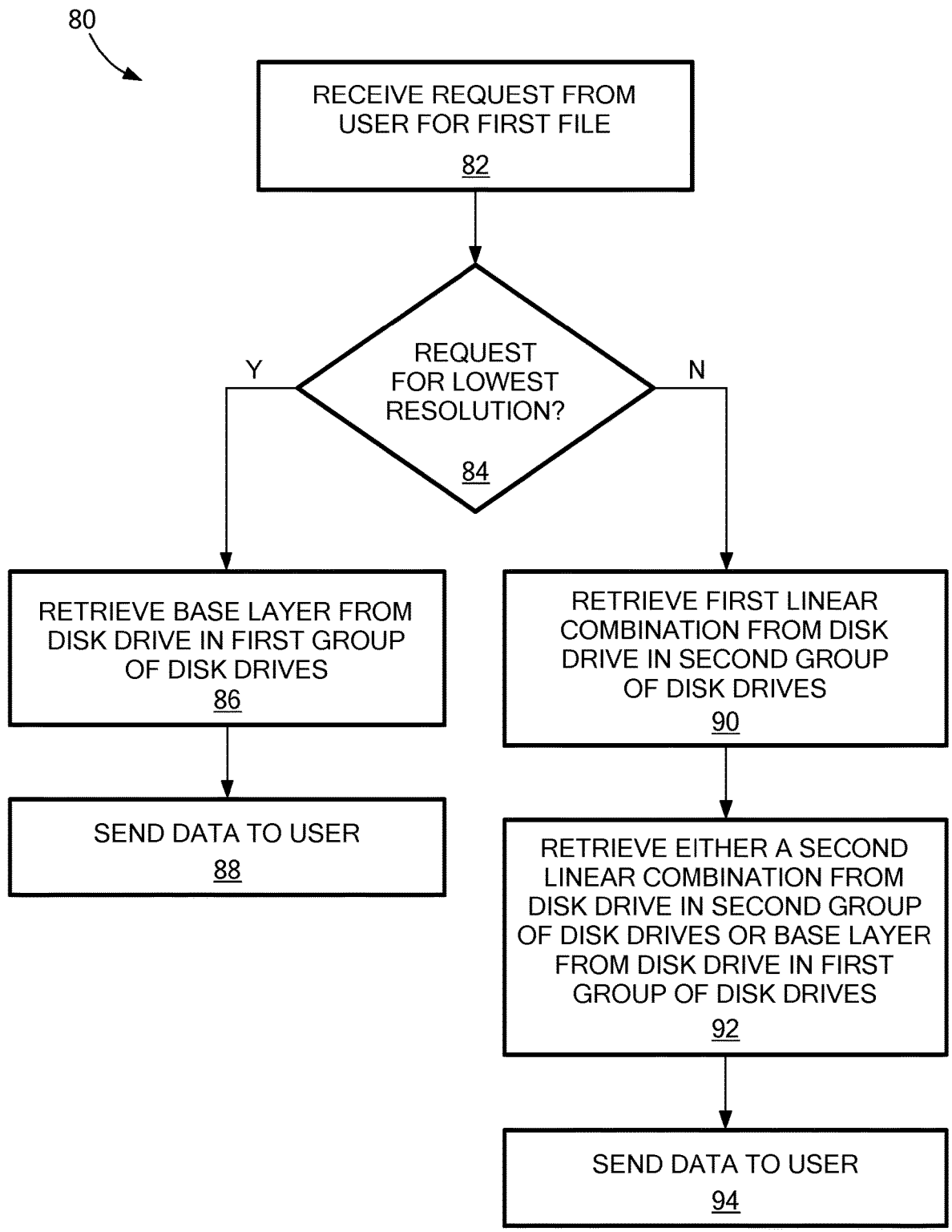
FIG. 5 is a flow diagram illustrating an exemplary method for providing streaming services to users in a system that uses systematic network coded storage to store multi-resolution encoded files in a plurality of disk drives in accordance with an embodiment.

FIGS. 4 and 5 are flow diagrams showing methods for use within data centers implementing systematic network coded storage using multi-resolution codes in accordance with embodiments.

The rectangular elements (typified by element 62 in FIG. 4) are herein denoted "processing blocks" and may represent computer software instructions or groups of instructions. It should be noted that the flow diagrams of FIGS. 4 and 5 represents one exemplary embodiment of the design described herein and variations in such a diagram, which generally follow the process outlined, are considered to be within the scope of the concepts, systems and techniques described and claimed herein.

Alternatively, the processing blocks may represent operations performed by functionally equivalent circuits such as a digital signal processor circuit, an application specific integrated circuit (ASIC), or a field programmable gate array (FPGA). Some processing blocks may be manually performed while other processing blocks may be performed by a processor. The flow diagram does not depict the syntax of any particular programming language. Rather, the flow diagram illustrates the functional information one of ordinary skill in the art requires to fabricate circuits and/or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described below are unordered meaning that, when possible, the sequences shown in FIGS. 4 and 5 can be performed in any convenient or desirable order.

FIG. 4 is a flow diagram illustrating a method 60 for storing multi-resolution coded files within a plurality of disk drives using systematic network coded storage in accordance with an embodiment. The method 60 may be performed in connection with, for example, data centers that are part of a content distribution network and/or other content delivery based systems. In some embodiments, the multi-resolution coded files may include multi-resolution coded video files. In the description below, the method 60 will be described in the context of a system that provides three different resolutions. It should be appreciated, however, that a variant of the method 60 may be used in systems that provide any number of resolution levels (i.e., two or more). A base layer of a first file is stored on each of a first group of disk drives (block 62). A linear combination of the base layer and a first refinement layer of the first file is stored on each of a second group of disk drives (block 64). Each linear combination that is stored may utilize a different set of random coefficients so that it is linearly independent (or innovative) to the other linear combinations. In some embodiments, a random number generator may be used to generate the linear combinations during the storage process. The random coefficients used for each linear combination may be stored in association with the corresponding combination (e.g., as meta data or in some other manner).

A linear combination of the base layer, the first refinement layer, and a second refinement layer of the first file is stored on each of a third group of disk drives (block 66). As before, each linear combination that is stored may utilize a different set of random coefficients and the coefficients may be stored in association with the combination. The above described method may be repeated for each file to be stored in a plurality of drives. In some embodiments, the first, second, and third groups of disk drives may each be associated with a particular server in a system. Also, in some embodiments, the first, second, and third groups of disk drives may have no common disk drives between them. However, other techniques for defining the first, second, and third groups of disk drives may alternatively be used (e.g., drive groups that span multiple different servers, drive groups having crossover between groups, etc.).

FIG. 5 is a flow diagram illustrating a method 80 for providing video streaming services to users in a system that uses systematic network coded storage to store multi-resolution encoded files in a plurality of disk drives in accordance with an embodiment. The method 80 may be performed in connection with, for example, data centers that are part of a content distribution network and/or other content delivery based systems. In the description below, the method 80 will be described in the context of a system that provides two different resolutions. It should be appreciated, however, that a variant of the method 80 may be used in systems that provide any number of resolution levels (i.e., two or more). A request for a first file (e.g., a video file, etc.) is first received from a user (block 82). It may then be determined whether the request is for a lowest available resolution (block 84). If the request is for a lowest resolution (block 84-Y), a non-network coded base layer of the requested file may be retrieved from a disk drive within a first group of drives (block 86). The base layer may be sent (or streamed) to the user (block 88). If none of the disk drives within the first group of drives has sufficient bandwidth available to service the request, the request may be denied. If denied, a request denial message may be sent to the user.

If the request is not for the lowest resolution (block 84-N), a first linear combination is retrieved from a second set of disk drives (block 90). The first linear combination is a linear combination of the base layer of the requested file and a first refinement layer of the requested file. In addition to the first linear combination, a second linear combination may be retrieved from a disk drive in the second set of disk drives or a non-network coded base layer of the requested file may be retrieved from a disk drive in a first group of drives (block 92). Blocks 90 and 92 can be performed in either order or in parallel. The retrieved data is delivered to the user (block 94). The network coding may be removed from the retrieved data within the data center or at the user location. If disk drives are not available within the first and second groups of drives to perform the above-described actions, the request may be denied. If denied, a request denial message may be sent to the user.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method for storing files at multiple different resolutions within a plurality of disk drives in a system that uses multi-resolution coding and for processing user file requests for the stored files, the method comprising:
storing a base layer of a first file in an original uncoded form on each of a first set of disk drives in the plurality of disk drives, the base layer providing a lowest resolution for the first file;
generating, for each of a second set of disk drives in the plurality of disk drives, two or more linear combinations of the base layer of the first file and at least one refinement layer of the first file, wherein the refinement layer provides a resolution for the first file higher than said lowest resolution, and wherein generating the linear combinations comprises using respective different random coefficients for each combination and systematic network coding where the base layer and refinement layer are made part of the encoded output; and
storing the linear combinations of the base layer of the first file and at the least one refinement layer of the first file on respective drives of the second set of disk drives in the plurality of disk drives;

the method further comprising:

receiving a request for the first file from a user at a specified resolution;

if the user requests the first file with said lowest resolution:

determining that at least one of the disk drives in the first set of disk drives has sufficient bandwidth available to process the request;

retrieving the base layer of the first file from the at least one of the first set of disk drives; and sending data to the user based upon the retrieved data;

if the user requests the first file with said higher resolution provided by the refinement layer:

determining that a first disk drive in the second set of disk drives has sufficient bandwidth available to process the request;

retrieving a first linear combination of the base layer and the at least one refinement layer of the first file from said first disk drive in the second set of disk drives; and retrieving either the base layer of the first file from an available one of the first set of disk drives or retrieving a second linear combination of the base layer and the at least one refinement layer from an available second disk drive of the second set of disk drives; and sending data to the user based upon the retrieved data.

2. The method of claim 1, wherein:
storing the linear combinations of the base layer and the refinement layer on each of the second set of disk drives includes storing the respective different random coefficients with each linear combination on each of the second set of disk drives.

3. The method of claim 1, wherein:
the first set of disk drives and the second set of disk drives have no disk drives in common.

4. The method of claim 1, further comprising:
storing a linear combination of the base layer of the first file, said refinement layer of the first file, and a further refinement layer of the first file on each of a third set of disk drives in the plurality of disk drives.

5. The method of claim 1, wherein:
the method is implemented in a data center associated with a content distribution network.

6. The method of claim 1, further comprising:
storing a base layer of a second file on each of the first set of disk drives in the plurality of disk drives; and
storing a linear combination of the base layer of the second file and a first refinement layer of the second file on each of the second set of disk drives in the plurality of disk drives.

7. The method of claim 1, wherein:
the first file includes a video file.

8. The method of claim 1 wherein sending data to the user based upon the retrieved data comprises sending data to the user at the specified resolution.

9. The method of claim 1, wherein said available second disk drive of the second set of disk drives is different than said first disk drive in the second set of disk drives.

10. A system comprising:
a plurality of disk drives; and
a controller to store files on the plurality of disk drives in multiple different resolutions using a multi-resolution code, the controller being configured to:

store a base layer of a first file in an original uncoded form on each of a first set of disk drives in the plurality of disk drives, the base layer providing a lowest resolution for the first file;

generate, for each of a second set of disk drives in the plurality of disk drives, two or more linear combinations of the base layer of the first file and at least one refinement layer of the first file, wherein the refinement layer provides a resolution for the first file higher than said lowest resolution, and wherein generating the linear combination comprises using respective different random coefficients for each combination and systematic network coding where the base layer and refinement layer are made part of the encoded output;

store, on each disk drive of the second set of disk drives, the respective linear combinations of the base layer of the first file and the at least one refinement layer of the first file;

receive a request for the first file from a user at a specified resolution;

if the user requests the first file with said lowest resolution:

determine that at least one of the disk drives in the first set of disk drives has sufficient bandwidth available to process the request;

retrieve the base layer of the first file from the at least one of the first set of disk drives; and send data to the user based upon the retrieved data;

if the user requests the first file with said higher resolution:

determine that a first disk drive in the second set of disk drives has sufficient bandwidth available to process the request;

retrieve a first linear combination of the base layer and the at least one refinement layer of the first file from said first disk drive in the second set of disk drives; and retrieve either the base layer of the first file from an available one of the first set of disk drives or a second linear combination of the base layer and the at least one refinement layer from an available second disk drive of the second set of disk drives; and send data to the user based upon the retrieved data.

11. The system of claim 10, wherein:
the controller is configured to store a linear combination of the base layer of the first file, said refinement layer of the first file, and a further refinement layer of the first file on each of a third set of disk drives in the plurality of disk drives.

12. The system of claim 10, wherein:
the controller is configured to:
store the respective different random coefficients on the each of the second set of disk drives in association with the corresponding linear combination.

13. The system of claim 10, further comprising:
a plurality of servers for use in servicing requests from users, wherein each server in the plurality of servers is associated with a different set of disk drives within the plurality of disk drives.

14. The system of claim 10, wherein:
the system is part of a data center associated with a content distribution network.

15. The system of claim 10, wherein:
the controller is configured to retrieve files from the plurality of disk drives in response to user requests, the controller to receive a user request for the first file at a next to lowest resolution and, in response thereto, retrieve a first linear combination of the base layer associated with the first file and the first refinement layer associated with the first file from a disk drive in the second set of disk drives, and retrieve either a base layer associated with the first file from a disk drive in the first set of disk drives or a second linear combination of the base layer associated with the first file and the first refinement layer associated with the first file from another disk drive in the second set of disk drives.

16. The system of claim 15, wherein:
the controller is configured to deliver data to the user that is based on the information retrieved from the plurality of disk drives.

17. The system of claim 10, wherein said available second disk drive of the second set of disk drives is different than said first disk drive in the second set of disk drives.

\* \* \* \* \*